United States Patent
Satterfield et al.

(10) Patent No.: US 10,158,281 B2
(45) Date of Patent: Dec. 18, 2018

(54) REDUCING A DROP IN A RESIDUAL SUPPLY SIGNAL LEVEL ON START UP OR RESTART OF A POWER SUPPLY

(71) Applicant: INTERSIL AMERICAS LLC, Milpitas, CA (US)

(72) Inventors: Harold William Satterfield, Rockledge, FL (US); James White, Melbourne, FL (US)

(73) Assignee: INTERSIL AMERICAS LLC, Milpitas, CA (US)

(*) Notice: Subject to any disclaimer, the term of this patent is extended or adjusted under 35 U.S.C. 154(b) by 11 days.

(21) Appl. No.: 15/076,515

(22) Filed: Mar. 21, 2016

(65) Prior Publication Data
US 2017/0077809 A1   Mar. 16, 2017

Related U.S. Application Data

(60) Provisional application No. 62/217,475, filed on Sep. 11, 2015, provisional application No. 62/272,419, filed on Dec. 29, 2015, provisional application No. 62/272,444, filed on Dec. 29, 2015.

(51) Int. Cl.
| | |
|---|---|
| H02M 1/36 | (2007.01) |
| H02M 1/14 | (2006.01) |
| H02M 3/158 | (2006.01) |
| H02M 3/00 | (2006.01) |
| G06F 1/26 | (2006.01) |

(52) U.S. Cl.
CPC ........... H02M 1/14 (2013.01); G06F 1/26 (2013.01); H02M 1/36 (2013.01); H02M 3/005 (2013.01); H02M 3/158 (2013.01); H02M 3/1584 (2013.01); H02M 2003/1586 (2013.01)

(58) Field of Classification Search
CPC .. H02M 1/36; H02M 2003/1586; G05F 1/468
See application file for complete search history.

(56) References Cited

U.S. PATENT DOCUMENTS

| | | | |
|---|---|---|---|
| 7,782,024 B2 | 8/2010 | Fukushi et al. | |
| 8,373,403 B1 | 2/2013 | Radovic | |
| 2004/0169498 A1 | 9/2004 | Goder et al. | |
| 2007/0064454 A1* | 3/2007 | Chen | H02M 1/36 363/49 |
| 2008/0036526 A1* | 2/2008 | Wu | H02M 3/157 327/520 |

(Continued)

*Primary Examiner* — Harry Behm
(74) *Attorney, Agent, or Firm* — Foley & Lardner LLP

(57) ABSTRACT

In an embodiment, a power-supply controller includes a control circuit, a drive circuit, and a signal-drop-reducing circuit. The control circuit is configured to generate a drive signal having a duty cycle, and the drive circuit is configured to cause a phase circuit of a power supply to generate, in response to the drive signal, an output signal having a magnitude. And the signal-drop-reducing circuit is configured to disable the driver circuit in response to the duty cycle corresponding to a signal magnitude that is lower than the magnitude of the output signal. For example, where a power supply has a non-zero residual output signal (e.g., output voltage) on its output node after the power supply is deactivated, such a power-supply controller can reduce or eliminate a drop in the residual output signal caused by, or that would be caused by, a restarting of the power supply.

21 Claims, 16 Drawing Sheets

(56) References Cited

U.S. PATENT DOCUMENTS

| | | |
|---|---|---|
| 2009/0167267 A1 | 7/2009 | Dwarakanath et al. |
| 2011/0109294 A1* | 5/2011 | Larson .................... H02M 1/36 323/285 |
| 2011/0181262 A1 | 7/2011 | Deguchi |
| 2014/0145698 A1 | 5/2014 | Saito et al. |
| 2016/0118888 A1 | 4/2016 | Xu et al. |

* cited by examiner

REDUCING A DROP IN A RESIDUAL SUPPLY SIGNAL LEVEL ON START UP OR RESTART OF A POWER SUPPLY

PRIORITY CLAIM

The present application claims priority from U.S. Provisional Patent Application No. 62/217,475, filed 11 Sep. 2015, and claims priority from U.S. Provisional Patent Application No. 62/272,444, filed 29 Dec. 2015, and claims priority from U.S. Provisional Patent Application No. 62/272,419, filed 29 Dec. 2015, which applications are incorporated herein by reference in their entireties.

CROSS-RELATED APPLICATIONS

The present application is related to copending U.S. patent application Ser. No. 15/076,526, filed Mar. 21, 2016, entitled REDUCING A DROP IN A RESIDUAL SUPPLY-SIGNAL LEVEL ON START UP OR RESTART OF A POWER SUPPLY, which application is incorporated herein by reference in its entirety.

SUMMARY

In an embodiment, a power-supply controller includes a control circuit, a drive circuit, and a signal-drop-reducing circuit. The control circuit is configured to generate a drive signal having a duty cycle, and the drive circuit is configured to cause a phase circuit of a power supply to generate, in response to the drive signal, an output signal having a magnitude. And the signal-drop-reducing circuit is configured to disable the driver circuit in response to the duty cycle corresponding to a signal magnitude that is lower than the magnitude of the output signal.

For example, if a power supply has a non-zero residual output signal (e.g., output voltage) on its output node after the power supply is deactivated, then such a power-supply controller can reduce or eliminate a drop in the residual output signal caused by, or that would be caused by, a restarting of the power supply. The power-supply controller reduces or eliminates the drop in the residual output voltage by deactivating (e.g., tri-stating) the power-supply phase circuit(s), analyzing the duty cycle of the power-supply switching signal to determine the level of the output signal that the duty cycle would support if the phase circuit(s) were active, and activating the phase circuit(s) only after the signal level that the duty cycle would support is equal to, or greater than, the residual output signal. Furthermore, such a power-supply controller may not require an additional pin to receive the output signal for the purpose of comparing it to the output-signal level that the duty cycle would support.

DETAILED DESCRIPTION

Figure 1:
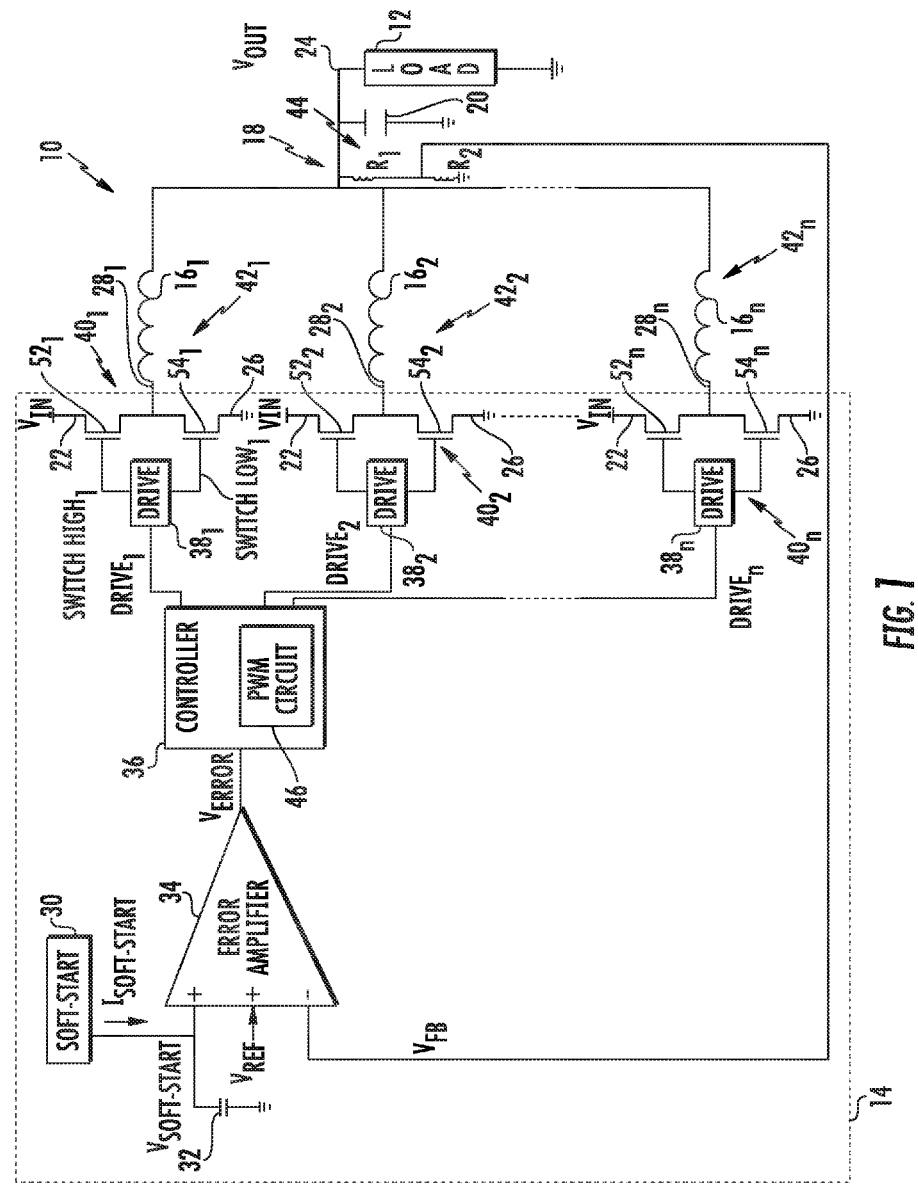
FIG. 1 is a diagram of a buck-converter power supply, and of a load powered by the buck converter.

FIG. 1 is a diagram of a power supply, here a buck converter 10, and a load 12 powered by the buck converter. As described below, a problem with the buck converter 10 is that when it is started or restarted with a non-zero residual output voltage $V_{out}$, the buck converter may cause $V_{out}$ to drop before $V_{out}$ increases to its regulated voltage level (e.g., 1.1 Volts (V) or 3.3 V). Unfortunately, such a drop in $V_{out}$ is undesirable in some applications.

The buck converter 10 includes a power-supply controller chip 14, one or more phase inductors $16_1$-$16_n$, a feedback circuit 18, an output filter capacitor 20, an input node 22 configured to receive an input voltage $V_{in}$, an output node 24 configured to provide the output voltage $V_{out}$, a reference node 26 configured to receive a reference voltage (here ground), and phase nodes $28_1$-$28_n$.

The power-supply controller chip 14 includes a soft-start circuit 30, a soft-start capacitor 32, an error amplifier 34, a controller 36, one or more switching-stage drive circuits $38_1$-$38_n$, and one or more phase switching stages $40_1$-$40_n$. Each switching stage $40_1$-$40_n$ and corresponding phase inductor $16_1$-$16_n$ forms a respective switching phase circuit $42_1$-$42_n$. And although described as being part of the power-supply controller chip 14, the switching stages $40_1$-$40_n$ can be separate from the controller chip.

The feedback circuit 18, which is optional, includes a resistor voltage divider 44 with resistors $R_1$ and $R_2$, and is configured to generate a feedback signal $V_{FB}$ according to the following equation:

$$V_{FB} = \frac{R_2}{R_1 + R_2} \cdot V_{out} \quad (1)$$

If the feedback circuit 18 is omitted from the buck converter 10, then $V_{FB}=V_{out}$.

The soft-start circuit 30 and capacitor 32 function together to generate a soft-start reference voltage, $V_{soft\text{-}start}$, during a start or a restart of the buck converter 10. As discussed below, $V_{soft\text{-}start}$ reduces the magnitude of, or eliminates, a transient voltage that the buck converter 10 superimposes on $V_{out}$ when $V_{out}$ is less than its regulated value. The soft-start circuit 30 generates, and provides to the capacitor 32, a substantially constant current $I_{soft\text{-}start}$, which causes the capacitor to generate $V_{soft\text{-}start}$ as a substantially linearly increasing, i.e., ramping, voltage.

The error amplifier 34 generates an error signal $V_{error}$ in response to a difference between the actual value of $V_{out}$ and $V_{out}$'s desired regulated value. During normal operation of the buck converter 10 in a continuous conduction mode (CCM) during which a current is always flowing through the inductor(s) 16₁-16ₙ to the output node 24, the error amplifier 34 is configured to compare the feedback signal $V_{FB}$ to a reference voltage (e.g., a bandgap reference voltage) $V_{ref}$, and during a start or restart of the buck converter, the error amplifier is configured to compare $V_{FB}$ to $V_{soft\text{-}start}$. The larger the magnitude of the difference between $V_{out}$ and either $V_{FB}$ or $V_{ref}$, the larger the magnitude of $V_{error}$; conversely, the smaller the magnitude of the difference between $V_{out}$ and either $V_{FB}$ or $V_{ref}$, the smaller the magnitude of $V_{error}$. Although not shown in FIG. 1, the error amplifier 34 includes external or internal compensation, typically in the form of an RC network coupled to at least the inverting input node and the output node of a high-gain amplifier that forms part of the error amplifier. The compensation is suitable for the type of the power supply (the buck converter 10 in FIG. 1), the type of load, and for other parameters of the power supply, such as, but not limited to, response time, power output, current output, stability margin, clock frequency, and control type (e.g., PWM, constant on time, and current-mode control). Examples of suitable error-amplifier compensation include Types I, II, and III compensation. Because such compensation can be conventional, it is not described in detail herein.

The controller 36 includes a pulse-width-modulation (PWM) circuit 46, which generates, from a master clock, i.e., from a master PWM signal, a respective pulse-width-modulated (PWM) drive signal Drive₁-Driveₙ for each of the switching phase circuits 42₁-42ₙ in response to $V_{error}$. Each signal Drive has the same duty cycle D, but has a different phase to reduce the amplitude of the ripple voltage on $V_{out}$ in a conventional manner; typically, the phase difference between each pair of signals Drive is 360°/n. The duty cycle D is related to $V_{error}$, and, therefore, is related to the difference between $V_{FB}$ and either $V_{ref}$ or $V_{soft\_start}$. For example, the more positive $V_{error}$, the lower is $V_{FB}$ compared to $V_{ref}$ or $V_{soft\_start}$ (and thus the lower $V_{out}$ is compared to its desired regulated value) and thus the larger the duty cycle D, so as to increase $V_{out}$ toward its regulated value. Conversely, the less positive $V_{error}$, the higher is $V_{out}$ compared to $V_{ref}$ or $V_{soft\_start}$ (and thus the higher $V_{out}$ is compared to its regulated value), and thus the smaller the duty cycle D, so as to decrease $V_{out}$ toward its regulated value.

Figure 2:
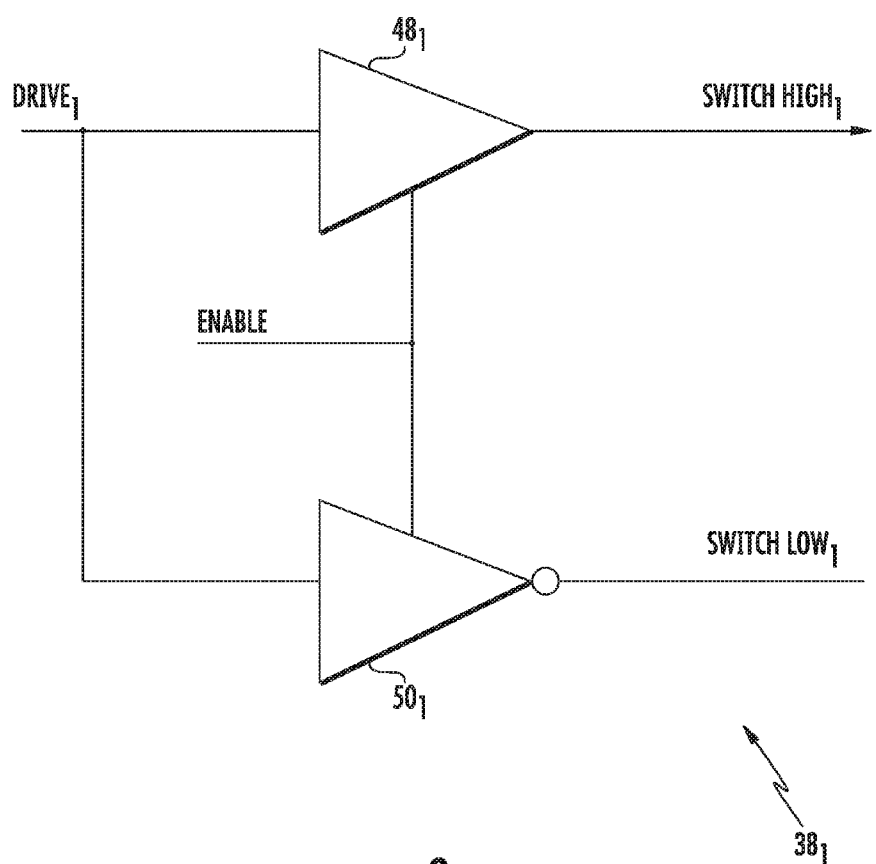
FIG. 2 is a diagram of one of the drive circuits of FIG. 1.

FIG. 2 is a schematic diagram of the switching-stage drive circuit 38₁ of FIG. 1 according to an embodiment, it being understood that the other drive circuits 38₂-38ₙ are similar.

Referring to FIGS. 1-2, each switching-stage drive circuit 38₁-38ₙ converts the respective drive signal Drive₁-Driveₙ into a pair of signals Switch$_{High}$ and Switch$_{Low}$ for driving the respective switching stages 40₁-40ₙ. For example, referring to FIG. 2, the switching-stage drive circuit 38₁ includes a non-inverting buffer 48₁, which generates Switch$_{High1}$ equal to Drive₁, and includes an inverting buffer 50₁, which generates Switch$_{Low1}$ equal to $\overline{\text{Drive1}}$. Therefore, in an embodiment, Switch$_{High1}$=$\overline{\text{Switch}_{Low1}}$, although in another embodiment, the switching-stage drive circuit 38₁ is configured to generate Switch$_{High1}$ and Switch$_{Low1}$ so that they are both inactive (e.g., Logic 0=0 V) for a period of time to prevent a crowbar current from flowing in the switching stage 40₁. Furthermore, both of the buffers 48₁ and 50₁ are configured to generate an inactive voltage level, e.g., a logic 0, in response to a signal Enable having a level of logic 0, to deactivate the switching stage 40₁ as further discussed below. In an embodiment, the other drive circuits 38₂-38ₙ have the same structure, and are configured to operate in the same manner, as the switching-stage drive circuit 38₁.

Referring again to FIG. 1, each switching stage 40₁-40ₙ has a respective high-side switch, here a respective high-side transistor 52, e.g. NMOS transistor, and has a respective low-side switch, here a respective low-side transistor 54, e.g. NMOS transistor. In response to Switch$_{High}$=logic 1 (e.g., logic 1=the voltage at the respective phase node 28 (the bootstrapped voltage)+3.3 V) and Switch$_{Low}$=logic 0 (e.g., logic 0=0 V), a linearly increasing current flows from the input node 22, through the active high-side transistor 52 and the corresponding inductor 16, to the output node 24; because the low-side transistor 54 is inactive, negligible or no current flows through the low-side transistor. Conversely, in response to Switch$_{High}$=logic 0 and Switch$_{Low}$=logic 1, a linearly decreasing current flows from the reference node 26 (here ground), through the active low-side transistor 54 and the corresponding inductor 16, to the output node 24; because the high-side transistor 52 is inactive, negligible or no current flows through the high-side transistor. And when Switch$_{High}$=Switch$_{Low}$=logic 0, both transistors 52 and 54 are inactive such that the switching stage 40 is tri-stated, i.e., the corresponding phase node 28 presents a high impedance to the inductor 16, output filter capacitor 20, and load 12 such that negligible or no current flows from the output node 24 into the phase node.

Referring to FIGS. 1 and 2 normal operation of the buck converter 10 in CCM mode is described, according to an embodiment.

The error amplifier 34 generates $V_{error}$ in response to the difference between $V_{FB}$ and $V_{ref}$; because $V_{FB}$ is linearly related to $V_{out}$ and $V_{ref}$ is linearly related to the regulated level of $V_{out}$, the error amplifier effectively generates $V_{error}$ in response to the difference between $V_{out}$ and its regulated level.

In response to $V_{error}$, the PWM circuit 46 of the controller 36 generates the PWM signals Drive₁-Driveₙ each having a duty cycle D that causes the average value of $V_{out}$ to move toward its regulated value, or to remain at its present value if the average of $V_{out}$ is equal to its regulated value. The PWM circuit 46 is configured to generate Drive₁-Driveₙ in response to a master clock signal, which can be the same as one of Drive₁-Driveₙ (e.g., Drive₁)

The switching-stage drive circuits 38₁-38ₙ convert the respective signals Drive₁-Driveₙ into respective switching signals Switch$_{High1}$-Switch$_{High\_n}$ and Switch$_{Low\_1}$-Switch$_{Low\_n}$ for driving the high-side transistors 52 and low-side transistors 54 with the duty cycle D.

And the switched transistors 52 and 54 cause respective phase currents to flow from the input node (Vin) 22, through the inductors 16, and to the output node 24 for powering the load 12.

Still referring to FIGS. 1 and 2, operation of the buck converter 10 during a start-up mode or restart mode, when the buck converter is being activated or reactivated after a period of inactivity, is described, according to an embodiment.

The soft-start circuit 30 and capacitor 32 generate the reference voltage $V_{soft\_start}$, which starts at zero and linearly ramps up to $V_{ref}$ over a period of time that is selected based on, e.g., the design of the buck converter 10 and the load 12. So, the buck converter 10 operates in a manner similar to that described above for the normal operation of the buck converter, except that the error amplifier 34 uses $V_{soft\_start}$ as the reference voltage until $V_{soft\_start}$ equals $V_{ref}$ at which time the buck converter deactivates the soft-start circuit 30 and the error amplifier transitions to using $V_{ref}$ as a reference instead of $V_{soft\_start}$. After the error amplifier 34 transitions to using $V_{ref}$ as a reference, the buck converter 10 enters its normal mode of operation as described above.

A reason for the buck converter 10 using $V_{soft\_start}$, instead of $V_{ref}$, as the reference voltage during start up is as follows. Upon starting the buck converter 10, $V_{out}$ may be significantly lower than its desired regulated level. Therefore, $V_{FB}$ may be significantly lower than $V_{ref}$, and, in response to this significant difference, the error amplifier 34 would tend to generate $V_{error}$ having a large positive value. This large, positive $V_{error}$ would cause the PWM circuit 46 to generate the signals Drive with a large duty cycle D, which would cause the transistors 52 and 54 to switch in such a way as to generate large phase currents into the output node 24. Because, for loop stability and to filter out noise, the response time of the feedback loop that includes the error amplifier 34 is relatively slow, after $V_{out}$ were to become equal to its regulated value, the large phase currents might cause a significant transient overshoot in $V_{out}$ during the time (sometimes called the transient-response time) that the feedback loop requires to reduce the phase currents to values that stabilize $V_{out}$ at its regulated value. But because $V_{soft\_start}$ ramps from 0 V at a rate that is comparable to the response time of the feedback loop, the difference between $V_{FB}$ and $V_{soft\_start}$ typically is not so large as to superimpose an excessive transient voltage on $V_{out}$.

In another embodiment, the error amplifier 34 is configured so that it generates $V_{error}$=0 if $V_{soft\_start}$<$V_{FB}$ such that the switching stages 40 are disabled, and enables the switching stages 40, and begins to generate a non-zero value for D, only when $V_{soft\_start}$≥$V_{FB}$. Therefore, the error amplifier 34 configured in this manner may further reduce the transient voltage that the buck converter 10 superimposes on $V_{out}$ during start or restart.

But even when the error amplifier 34 uses $V_{soft\_start}$ as a reference during startup, the feedback loop may still superimpose a significant transient voltage on $V_{out}$ if there is a significant residual $V_{out}$ on the output node 24 when the buck converter 10 starts or restarts.

A reason that such a residual $V_{out}$ may exist is discussed. During normal operation of the buck converter 10, the output filter capacitor 20 is charged to the regulated level of $V_{out}$. To adequately filter $V_{out}$, the output filter capacitor 20 is relatively large, and has a value ranging from tens of microfarads to hundreds of microfarads depending on the application. When the buck converter 10 is deactivated, e.g., during a low-power mode, such as a sleep mode, of the load 12, the drive circuits 38 deactivate the switching stages 40 such that the phase nodes 28 present high impedance to the output filter capacitor 20 as described above. Therefore, because, during a low-power mode, the load 12 also presents high impedance to the output filter capacitor 20, the only paths through which a capacitor-discharge current can flow are leakage paths that have relatively high impedances. Therefore, it may take a relatively long time, e.g., seconds, tens of seconds, or even minutes, for the voltage across the output filter capacitor 20 to decay to 0 V.

Because $V_{soft\_start}$ ramps up from 0 V, if the residual voltage $V_{out}$ is significant, then, upon starting the buck converter 10, $V_{out}$ may be significantly higher than $V_{soft\_start}$. Therefore, $V_{FB}$ may be significantly higher than $V_{soft\_start}$, and, in response to this significant difference, the error amplifier 34 would tend to generate $V_{error}$ at its lowest value. This lowest value of $V_{error}$ would cause the PWM circuit 46 to generate the signals Drive with a small duty cycle D, which would cause the transistors 52 and 54 to switch in such a way as to cause $V_{out}$ to fall to a lower value; that is, the small duty cycle D could cause $V_{out}$ to discharge, and to thus fall, from its previous residual value. In more detail, because the response time of the voltage-regulating feedback loop is relatively slow as discussed above, even if the buck converter 10 is configured to disable the switching stages 40 until $V_{soft\_start}$≥$V_{FB}$, the slow response time of the regulation loop may delay the increase in $V_{error}$, and, therefore, may cause D, and thus the output voltage corresponding to D, to increase slowly for a period of time during which $V_{out}$ may experience a voltage drop.

Figure 3:
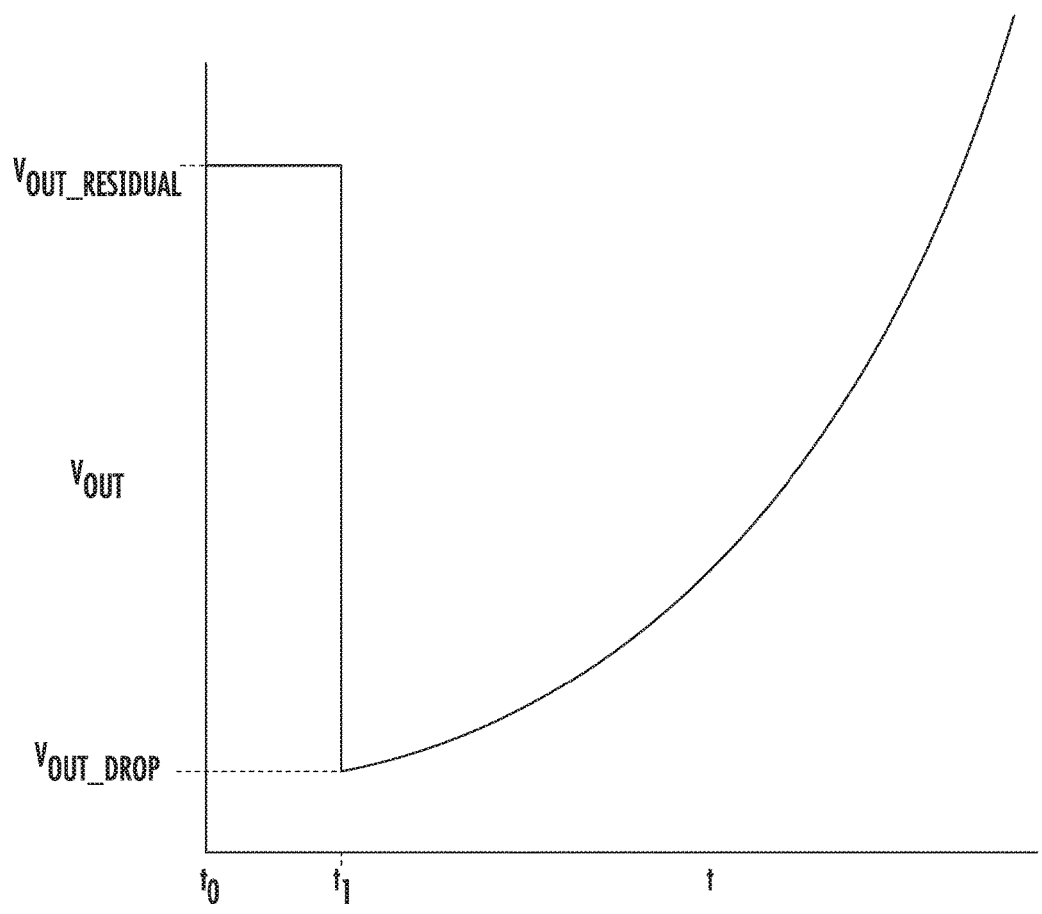
FIG. 3 is a plot of the supply output voltage generated by the buck converter power supply of FIG. 1 on restart of the buck converter.

FIG. 3 is a plot of $V_{out}$ on the output node 24 of the buck-converter 10 of FIG. 1, according to an example where $V_{out}$ experiences a significant reduction, i.e., drop, from its residual value $V_{out\_residual}$ during a restart period of the buck converter 10.

Referring to FIGS. 1 and 3, during a period $t_0$-$t_1$, $V_{out}$ has a non-zero residual value $V_{out\_residual}$ (the period $t_0$-$t_1$ is assumed to be short enough relative to the discharge time constant of the output filter capacitor 20 so that $V_{out\_residual}$ can be assumed to be constant during this time period). At time $t_1$, the buck converter 10 starts or restarts, e.g., because the load 12 is "awakening" from a "sleep" or other idle mode. If the buck converter 10 starts or restarts by commencing a soft-start cycle, because $V_{soft\_start}$ is 0 V, the difference between $V_{FB}$ and $V_{soft\_start}$ at time $t_1$ is so large, and the response time of the feedback loop so slow, that the buck converter 10 causes a significant transient drop in $V_{out}$, from $V_{out\_residual}$ to $V_{out\_drop}$, before the feedback loop can recover and begin to increase $V_{out}$ toward its regulated value. The difference between $V_{out\_residual}$ and $V_{out\_drop}$ is typically in the range from a few tens of millivolts (mV) to hundreds of millivolts, or even to 1 V or more. And, as stated above, even if the error amplifier 34 is configured to generate $V_{error}$=0 in response to a large difference between $V_{FB}$ and $V_{soft\_start}$, and even if the buck converter 10 is configured to disable the switching stages 40 until $V_{soft\_start}$≥$V_{FB}$, the slow response time of the regulation loop still can cause a drop in $V_{out}$, although perhaps not as severe a drop as described above.

Still referring to FIGS. 1 and 3, in at least some applications, such a drop in $V_{out}$ from its residual value $V_{out\_residual}$ to a drop value $V_{out\_drop}$ is undesirable. For example, such drop in $V_{out}$ represents a loss of energy such that if the load 12 is battery powered, this voltage drop may shorten the amount of time that the load can operate between battery recharges, particularly if the load frequently enters and exits one or more low-power states. Furthermore, if $V_{out\_residual}$ is higher than a start-up threshold supply voltage when the load 12 exits a low-power state, then the load may not need to reinitialize, e.g., configuration and other memory registers, and, therefore, this may shorten the time, and reduce the amount of energy, that it takes the load to exit the low-power state; such a situation may arise when the load is in the low-power state for a relatively short period of time, which is common in today's "green" electronic devices. But if the buck converter 10 causes $V_{out\_residual}$ to drop below the start-up threshold supply voltage of the load 12, then the load may require a significantly longer time, and significantly more energy, to "wake up." That is, if the buck converter 10 were not to cause a significant drop in $V_{out\_residual}$, then this would increase the chances that upon "awakening," the load 12 could execute a shorter and less-energy-consuming "wake-up" routine as compared to the "wake-up" routine that the load executes when $V_{out}$ is below the start-up threshold supply voltage. Moreover, a significant drop in $V_{out\_residual}$ also can affect analog circuits adversely. For example, a phase-lock loop may be forced to reacquire lock during a reacquisition time if its power-supply voltage drops below a minimum threshold.

Figure 4:
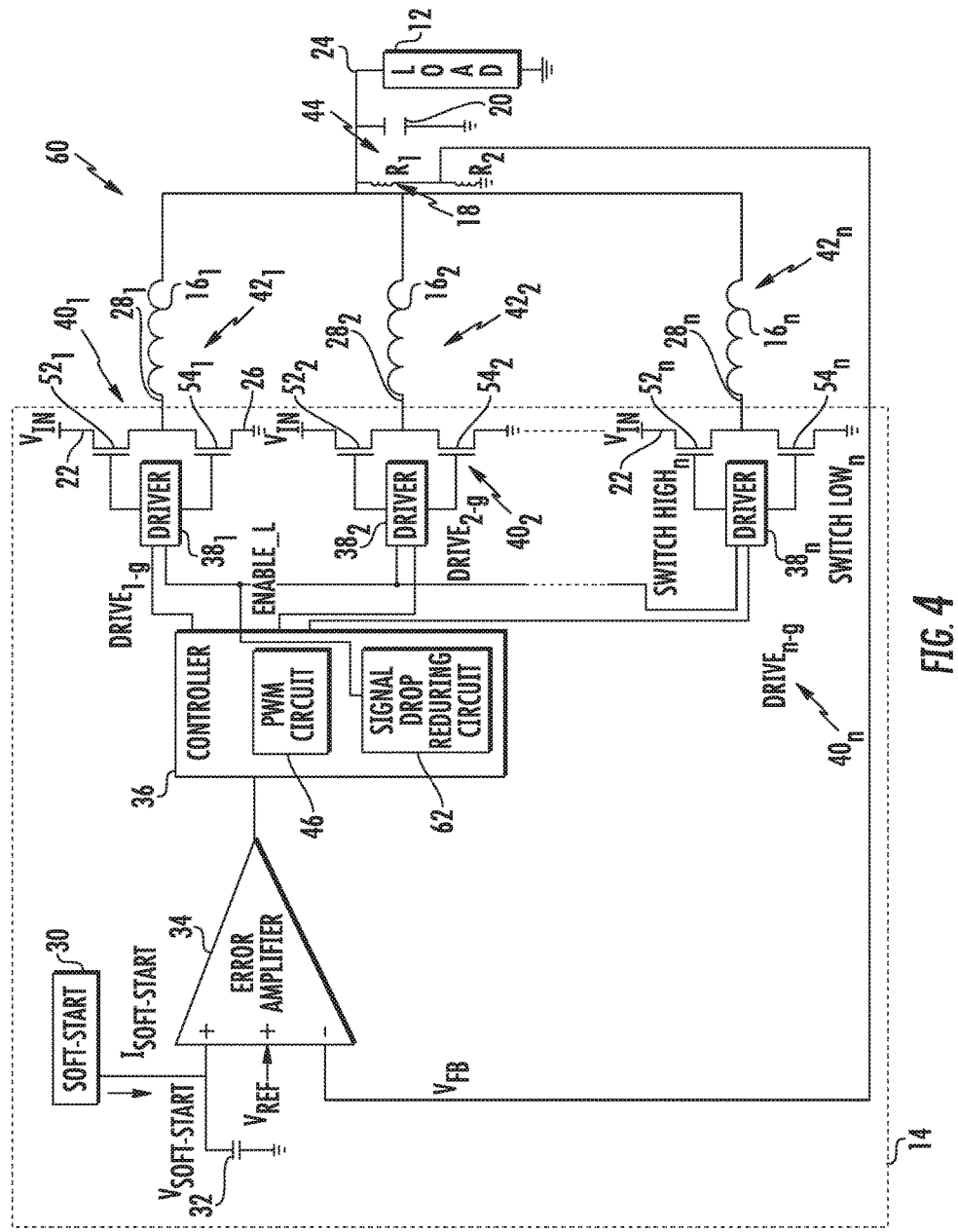
FIG. 4 is a diagram of a buck converter power supply, and of a load powered by the buck converter, according to an embodiment.

FIG. 4 is a diagram of a buck converter 60, which includes a signal-drop-reducing circuit 62 for reducing or eliminating a drop in $V_{out\_residual}$ on start or restart of the buck converter, according to an embodiment. In FIG. 4, components common to the buck converter 10 of FIG. 1 may be labeled with the same reference numbers, and, for brevity, are not described again.

The signal-drop-reducing circuit 62 reduces or eliminates a drop in $V_{out\_residual}$ by generating a signal Enable having a value (e.g., logic 0) that disables the switching stages 40, and that thus causes the phase nodes 28 to present a high impedance to the output filter capacitor 20, until the voltage corresponding to the duty cycle D of the PWM signals Drive$_1$-Drive$_n$ is equal to or greater than $V_{out\_residual}$. Therefore, by the time that the signal-drop-reducing circuit 62 enables the switching stages 40, the duty cycle D is large enough to ensure that the high-side transistors 52 are active long enough compared to the low-side transistors 54 so that little or no output-voltage-lowering reverse currents flow through the inductors 16. Consequently, the buck converter 60 causes little or no drop in $V_{out\_residual}$ such that when the signal-drop-reducing circuit 62 finally activates the switching stages 40, $V_{out}$ rises from $V_{out\_residual}$ to its regulated value with little or no transient drop.

The signal-drop-reducing circuit 62 functions as described above by taking advantage of the known relationship between $V_{in}$, $V_{out}$, and D to determine, in response to D, a voltage that corresponds to D and when this corresponding voltage equals, or is greater than, $V_{out\_residual}$.

Figure 5:
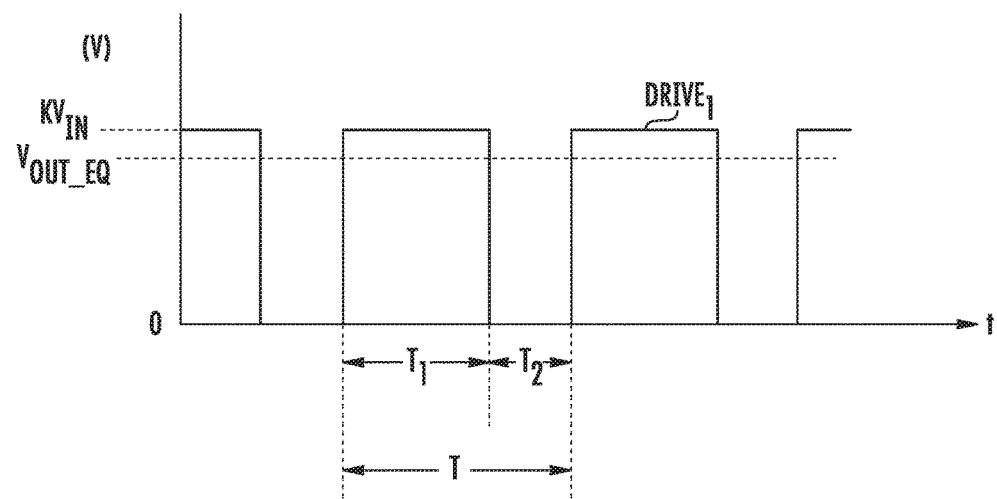
FIG. 5 is a plot of a pulse-width-modulated (PWM) drive signal generated by the PWM circuit of FIG. 4, according to an embodiment.

FIG. 5 is a plot of the drive signal Drive$_1$ of FIG. 4, according to an embodiment. It is understood, however, that a similar analysis applies to the drive signals Drive$_2$-Drive$_n$, and to a master clock or PWM signal from which the signals Drive may be generated.

Referring to FIGS. 4 and 5, during normal, CCM operation of the buck converter 60, Drive$_1$ equals K·$V_{in}$ (K is a constant) during a time $T_1$ of a PWM switching period T, Drive$_1$ equals 0 V during a time $T_2$ of the PWM switching period T, $T_1+T_2=T$, the high-side transistor 52$_1$ is active during $T_1$ and is inactive during $T_2$, and the low-side transistor 54$_1$ is inactive during $T_1$ and is active during $T_2$. The relationship between D, $V_{in}$, and $V_{out}$ for an ideal buck converter, is given by the following equation:

$$V_{out} = V_{in} \cdot \frac{T_1}{T} = V_{in} \cdot D \quad (2)$$

where $$D = \frac{T_1}{T},$$

and CCM operation means that there are always currents flowing through the inductors 16 into the output node 24 during the entire PWM period T. And the constant K is a scale factor introduced because the Drive$_1$ signal is typically a digital logic level (such as 0 V to 3.3 V), and $V_{in}$ could be a different level (such as 12 V). It is understood that equation (2) describes the behavior of an ideal buck converter with 100% efficiency. However, it is typically a good-enough approximation for high-efficiency buck converters, for example buck converters with efficiencies of 90% or higher. In the remainder of this disclosure, ideal equations will be used with the understanding that they are good-enough approximations of the behavior of high-efficiency converters.

Although during start or restart of the buck converter 60 equation (2) does not hold because the phase nodes 28 present high impedances to the output node 24, one can still determine the equivalent output voltage, $V_{out\_eq}$, that the duty cycle D would generate if the switching stages 40 here active, according to the following equation for an ideal buck converter:

$$V_{out\_eq} = V_{in} \cdot D \quad (3)$$

That is, $V_{out\_eq}$ is the voltage to which D corresponds when the switching stages 40 are disabled, whereas $V_{out}$ is the voltage to which D corresponds, and which D causes the buck converter 60 to generate on the output node 24, when the switching stages are enabled.

Figure 6:
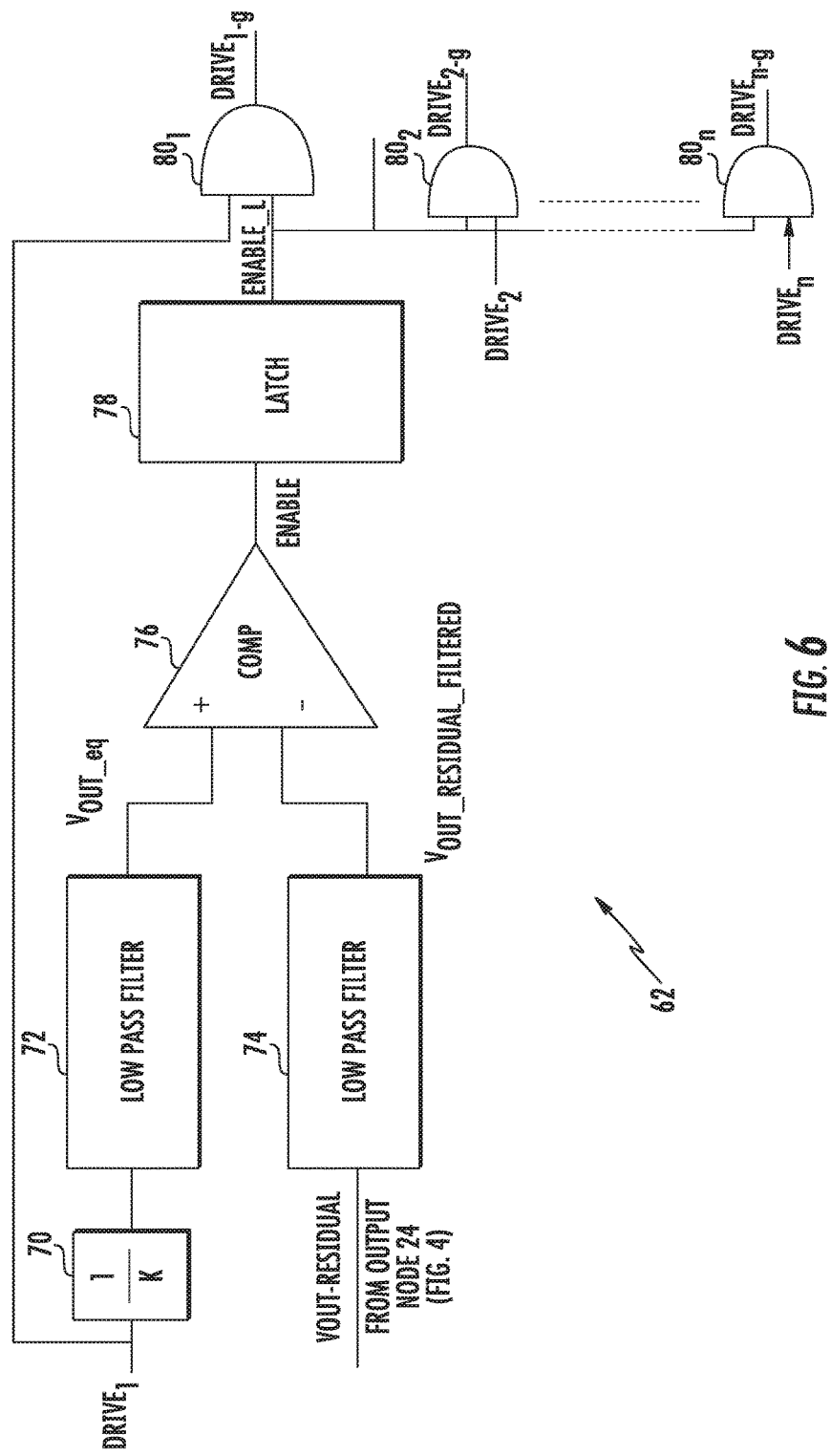
FIG. 6 is a diagram of the signal-drop-reducing circuit of FIG. 4, according to an embodiment.

FIG. 6 is a diagram of the signal-drop-reducing circuit 62 of FIG. 4, according to an embodiment.

The signal-drop-reducing circuit 62 includes an amplifier 70, a first low-pass filter 72, a second low-pass filter 74, a comparator 76, a latch 78, and AND gates 80$_1$-80$_n$.

The amplifier 70 multiplies the drive signal Drive$_1$ by 1/K, and the low-pass filter 72 effectively takes the average of Drive$_1$/K to generate, at least approximately, $V_{out\_eq}$ per equation (4) below. As described below in conjunction with FIG. 7, depending on its frequency response, the filter 72 may generate an approximate version of $V_{out\_eq}$ with a small ripple voltage.

Referring again to FIG. 5, one can see that $V_{out\_eq}$ equals the time average of $$\frac{\text{Drive}_1}{K}$$

according to the following equation, for an ideal buck converter:

$$V_{out\_eq} = \frac{(\text{Drive}_1/K) \cdot T_1}{T} = \frac{(K\, Vin/K) \cdot T_1}{T} = \frac{Vin \cdot T_1}{T} = Vin \cdot D \quad (4)$$

The low-pass filter 74, which is optional in this embodiment, generates $V_{out\_residual\_filtered}$ by effectively taking the average of $V_{out\_residual}$ while the buck converter 60 (FIG. 4) is starting or restarting.

The comparator 76 compares $V_{out\_eq}$ from the first low-pass filter 72 and $V_{out\_residual\_filtered}$ from the second low-pass filter 74 ($V_{out\_residual\_filtered}=V_{out\_residual}$ if the second low-pass filter is omitted from the circuit 62), and generates the signal Enable having a disable value (e.g., logic 0) if $V_{out\_eq} \leq V_{out\_residual\_filtered}$ and having an enable value (e.g., logic 1) if $V_{out\_eq} > V_{out\_residual\_filtered}$. That is, the comparator 76 generates Enable having an enable value only if the voltage corresponding to the duty cycle D of Drive$_1$ is greater than $V_{out\_residual\_filtered}$.

The latch 78 latches Enable upon the transition of Enable from its disable value (e.g., logic 0) to its enable value (e.g., logic 1) to generate Enable_L, which is the latched version of Enable.

And the AND gates $80_1$-$80_n$, which are optional, generate gated versions Drive$_{1\_g}$-Drive$_{n\_g}$ of the drive signals Drive$_1$-Drive$_n$, respectively, in response to Enable_L having an enable value; when Enable_L has a disable value, the AND gates generate Drive$_{1\_g}$=Drive$_{2\_g}$= . . . =Drive$_{n\_g}$=0.

Referring to FIGS. 4 and 6, although the power-supply controller chip 14 has no pin that is directly connected to the output node 24, the low-pass filter 74 can receive $V_{out\_residual}$ via one of the phase nodes 28 to avoid the need to add an additional pin to the controller. Because the signal-drop-reducing circuit 62 operates while the phase nodes 28 present high impedance to the output node 24, sometime after the switching stages 40 are disabled, negligible or no current flows through the inductors 16 such that $V_{out\_residual}$ also appears on the phase nodes. And even though $V_{out}$ does not appear on the phase nodes 28 after the signal-drop-reducing circuit 62 activates the switching stages 40, the signal-drop-reducing circuit need not receive $V_{out\_residual}$ or $V_{out}$ once it generates Enable_L having an enable level since the latch 78 latches the enable level of Enable_L.

Figure 7:
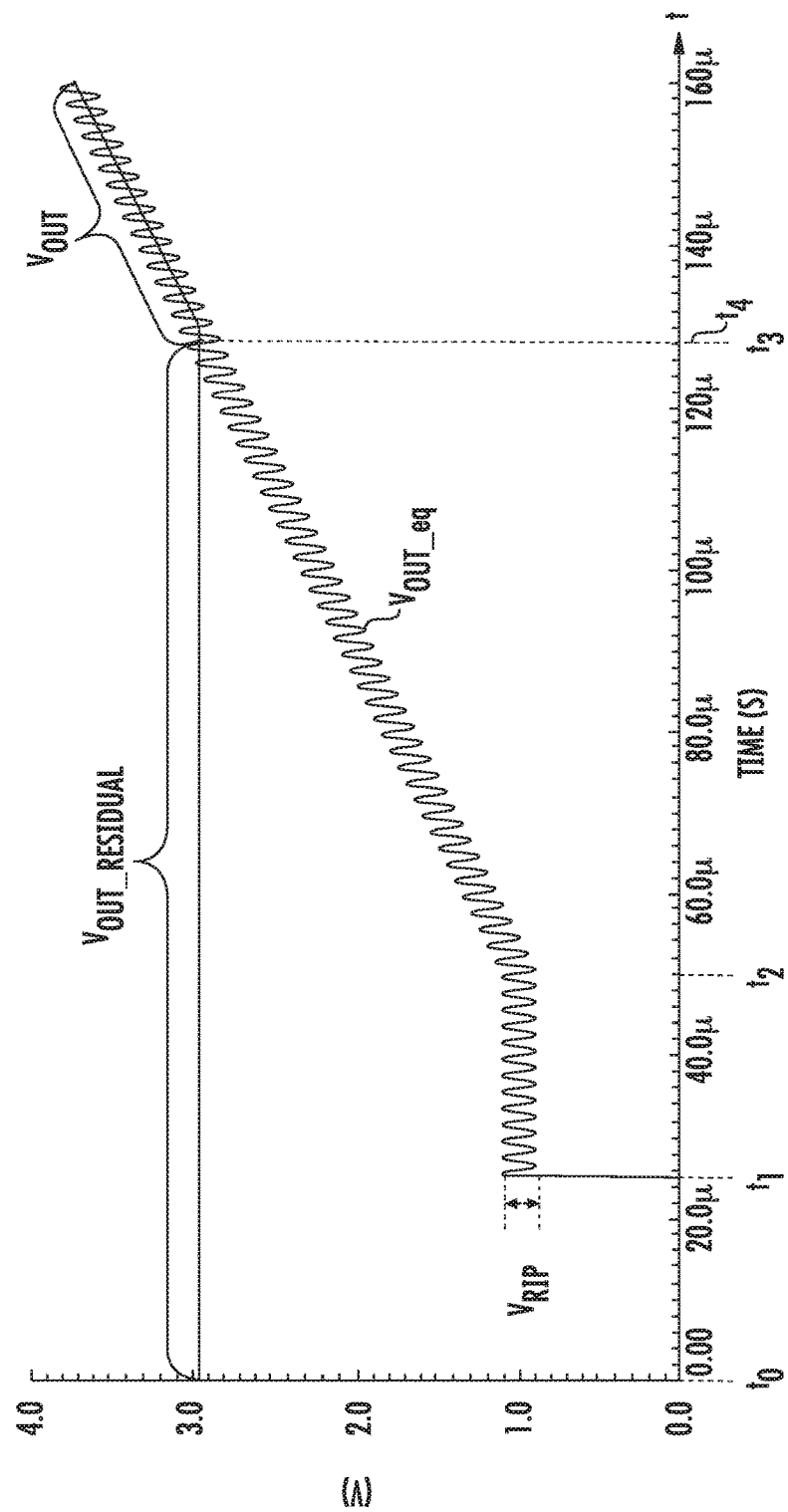
FIG. 7 is a plot of a filtered PWM drive signal generated by the signal-drop-reducing circuit of FIG. 6, and of the supply output voltage generated by the buck converter of FIG. 4, according to an embodiment.

FIG. 7 is a plot of $V_{out\_residual}$ on the output node 24 of FIG. 4 and of $V_{out\_eq}$ of FIG. 6, according to an embodiment. In this example, $V_{out\_eq}$ has a ripple voltage, $V_{rip}$, superimposed on it, where the amplitude of $V_{rip}$ is related to the frequency response of the low-pass filter 72 of FIG. 6.

Referring to FIGS. 4-7, operation of the buck converter 60 during start and restart is described, according to an embodiment in which the error amplifier 34 is configured to generate $V_{error}=0$ at least until $V_{soft\_start}=V_{FB}$. Furthermore, for purposes of example, $V_{out\_residual}$ is assumed to equal 3 V and to be constant until the signal-drop-reducing circuit 62 enables the switching stages 40.

First, in response to a start/restart signal (not shown in FIGS. 4-7) from the load 12, at a time $t_0$ the power-supply controller chip 14 activates the soft-start circuit 30, which commences ramping up $V_{soft\_start}$ from 0 V ($V_{soft\_start}$ not shown in FIGS. 4-7).

Next, during a time period from $t_0$ to a time $t_1$, $V_{soft\_start} < V_{FB}$ such that $V_{error}$=Drive$_1$=0 (i.e., the duty cycle D of Drive$_1$ equals zero). Because Drive$_1$, and thus $V_{out\_eq}$, are less than $V_{out\_residual}$, the comparator 76 generates the signal Enable having a disable level (e.g., logic 0) such that the switching stages 40 are disabled and the phase nodes 28 present high impedances to the output node 24 of the buck converter 10.

Then, at $t_1$, $V_{soft\_start}$ exceeds $V_{FB}$ such that $V_{error}$ begins to increase from a starting voltage of 0 V. In response to $V_{error}$ increasing from 0 V, the PWM circuit 46 generates Drive$_1$ having a minimum, nonzero, duty cycle 0<D<<1.

That is, D effectively "jumps" from zero to a minimum nonzero value, which depends on, e.g., the design and configuration of the PWM circuit. Typically, the reason that the PWM circuit 46 generates Drive$_1$ having a minimum nonzero value for D is because due to circuit-timing limitations, the PWM circuit cannot generate Drive$_1$ having a duty cycle D less than this minimum nonzero value, at least not in a reliable manner. In response to Drive$_1$ having the minimum duty cycle, the low-pass filter 72 generates $V_{out\_eq}$ having a minimum amplitude that corresponds to the minimum duty cycle D.

Next, during a time period from $t_1$ to a time $t_2$, although $V_{soft\_start}$ continues to increase, $V_{out\_residual}$, and thus $V_{FB}$, remain at constant values because the signal-drop-reducing circuit 62 is still disabling the switching stages 40. And although the difference between $V_{soft\_start}$ and $V_{FB}$ is increasing, as is $V_{error}$, the increasing $V_{error}$ is still not high enough to cause the PWM circuit 46 to increase the duty cycle D of the signal Drive$_1$ above its minimum value.

Then, at $t_2$, the difference between the still-increasing $V_{soft\_start}$ and the still-constant $V_{FB}$ is large enough to increase $V_{error}$ to a level that is sufficient to cause the PWM circuit 46 to increase the duty cycle D of the signal Drive$_1$ above the minimum duty-cycle value. But because $V_{out\_eq}$ is still less than $V_{out\_residual}$, the comparator 76 continues to disable the switching stages 40 by generating the signal Enable having a disable level.

Next, during a time period from $t_2$ to a time $t_3$, $V_{soft\_start}$ continues to increase, $V_{FB}$ continues to remain at a constant value, and $V_{error}$, D, and $V_{out\_eq}$ continue to increase. Yet $V_{out\_eq}$ is still less than $V_{out\_residual}$ such that the comparator 76 continues to disable the switching stages 40 by generating Enable having a disable level.

Then, at $t_3$, $V_{error}$, and thus D, are high enough such that $V_{out\_eq}$ exceeds $V_{out\_residual}$. In response to $V_{out\_eq}$ exceeding $V_{out\_residual}$, the comparator 76 generates Enable having an enable level, in response to which the latch 78 latches Enable and generates Enable_L also having an enable level. And in response to Enable_L having an enable level, the AND gates $80_1$-$80_n$ generate Drive$_{1\_g}$-Drive$_{n\_g}$ respectively equal to Drive$_1$-Drive$_n$, and enable the switching stages 40. Because the signal-drop-reducing circuit 62 enables the switching stages 40 only after $V_{out\_eq}$ exceeds $V_{out\_residual}$, the buck converter 62 causes little or no voltage drop in $V_{out}$ when the switching stages are activated (for purposes of naming convention, the name of the voltage on the output node 24 of the buck-converter 10 changes from $V_{out\_residual}$ to $V_{out}$ upon the enabling of the switching stages 40, and transitions from $V_{out}$ to $V_{out\_residual}$ upon disabling of the switching stages).

And even though at a time $t_4$ $V_{out\_eq}$ falls below $V_{out}$ (the voltage on the output node 24 is now named $V_{out}$ because the switching stages 40 are enabled), the switching stages remain enabled because the latch 78 already has latched Enable_L having an enable level.

After $t_3$, $V_{soft\_start}$ continues to increase until it equals $V_{ref}$, at which point the error amplifier 34 begins to compare $V_{FB}$ to $V_{ref}$ instead of to $V_{soft\_start}$. Furthermore, $V_{FB}$, $V_{error}$, and the duty cycle D of Drive$_{1\_g}$-Drive$_{n\_g}$ increase until $V_{out}$ equals its regulated voltage level.

Referring to FIGS. 4-7, alternate embodiments of the buck converter 60 are contemplated. For example, although described as a multiphase buck converter, the buck converter 60 may be a single-phase buck converter that otherwise operates in a manner similar to that described above. Furthermore, although the signal-drop-reducing circuit 62 is described as generating $V_{out\_eq}$ from the signal Drive$_1$, the signal-drop-reducing circuit can generate $V_{out\_eq}$ from any of the other signals $Drive_2$-$Drive_n$, or from a master PWM signal from which $Drive_1$-$Drive_n$ are generated. Moreover, the inductors 16 of each phase may be magnetically uncoupled from one another, or two or more of the phase inductors may be magnetically coupled to one another. In addition, instead of including two transistors 52 and 54, e.g. NMOS transistors, as switches, each switching stage 40 may include a PMOS transistor for the high-side switch, for the low-side switch, or both the high-side and low-side switches. Furthermore, as described above in conjunction with FIG. 1, in an embodiment, the error amplifier 34 includes suitable internal or external compensation that causes the buck converter 60 to operate according to the above-described embodiment.

Figure 8:
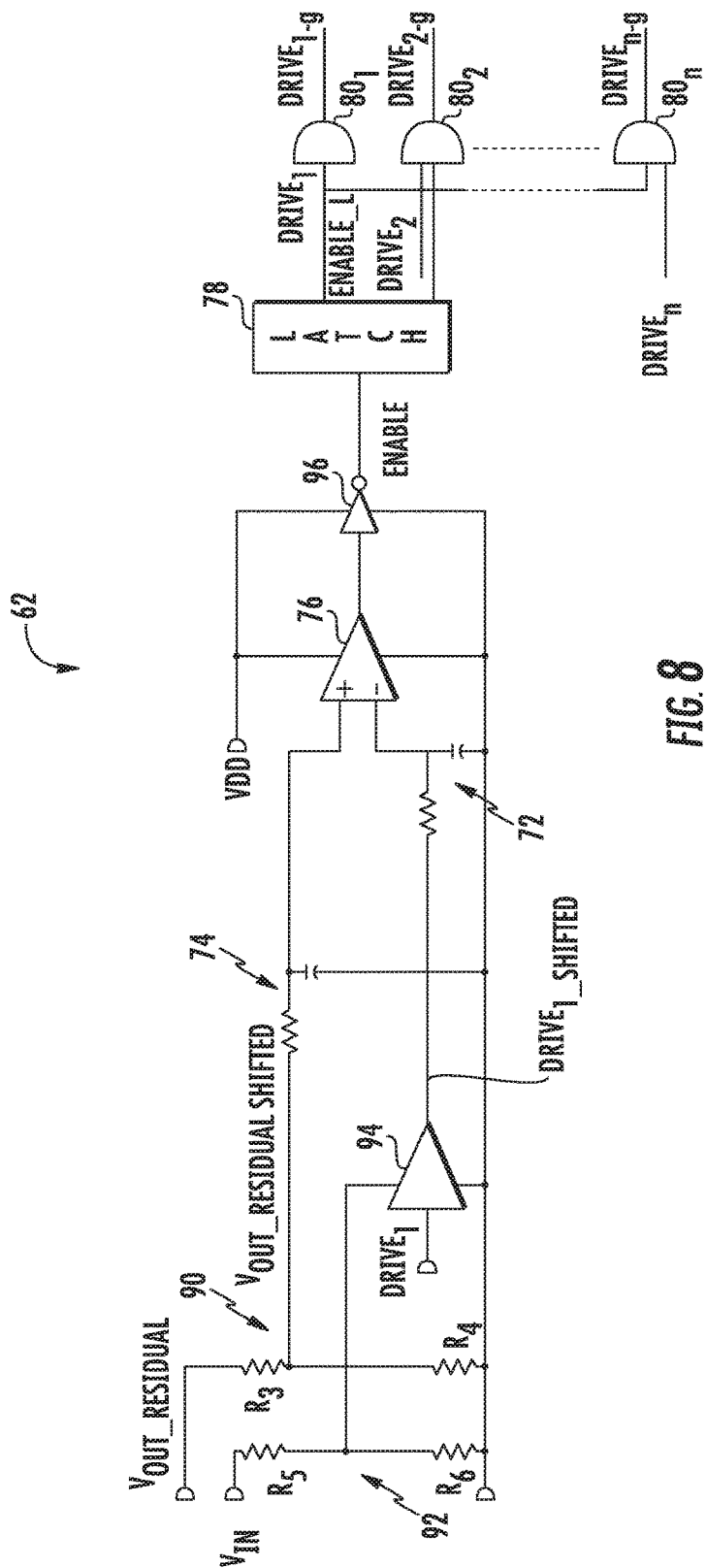
FIG. 8 is a diagram of a portion of the signal-drop-reducing circuit of FIG. 6, according to an embodiment.

FIG. 8 is a diagram of the signal-drop-reducing circuit 62 of FIG. 4 according to another embodiment in which the signals $V_{out\_residual}$ and $Drive_1$ are scaled, or level shifted, so that their voltage levels are compatible with the voltage levels within the power-supply controller chip 14. Furthermore, components common to FIGS. 6 and 8 are labeled with the same reference numbers.

In addition to the low-pass filters 72 and 74, comparator 76, latch 78, and AND gates $80_1$-$80_n$, the signal-drop-reducing circuit 62 includes two level shifters 90 and 92 for scaling $V_{out\_residual}$ and $Drive_1$ to be compatible with the supply voltage $V_{dd}$ used internal to the power-supply controller chip 14 (FIG. 4).

The level shifter 90 includes resistors $R_3$ and $R_4$ arranged as a voltage divider such that the signal $V_{out\_residual\_shifted}$ that the level shifter provides to the low-pass filter 74 is giving by the following equation:

$$V_{out\_residual\_shifted} = \frac{R_4}{R_3 + R_4} \cdot V_{out\_residual} \quad (5)$$

where $$\frac{R_4}{R_3 + R_4} = \frac{1}{6}$$

in an example application. In this example, a factor of ⅙ is sufficient for the amplitudes of the signals input to the comparator 76 to be less than $V_{dd}$.

The level shifter 92 includes resistors $R_5$ and $R_6$ arranged as a voltage divider, and a logic buffer 94, such that the logic-1 value of the signal $Drive_{1\_shifted}$ that the level shifter provides to the low-pass filter 72 is giving by the following equation:

$$Drive_{1\_shifted\_logic\_1} = V_{in} \cdot \frac{R_6}{R_5 + R_6} \quad (6)$$

where $$\frac{R_6}{R_5 + R_6} = \frac{1}{6}$$

in an example application. In more detail, the resistors $R_5$ and $R_6$ provide $V_{in}/6$ to the supply node of the buffer 96. Because $Drive_1$ alternates between logic 0 and logic 1, $R_5$ and $R_6$ effectively set logic 1 for $Drive_1$ equal to $V_{in}/6$ (logic 0=ground=0 V in this example). And by effectively setting logic 1 for $Drive_1$ equal to $V_{in}/6$, the buffer 96 eliminates the need for the 1/K amplifier of FIG. 6.

Depending on the design and configuration of the signal-drop-reducing circuit 62, the signals $Drive_1$-$Drive_n$ may or may not be level shifted in a similar manner before being input to the AND gates $80_1$-$80_n$, respectively. If the signals $Drive_1$-$Drive_n$ are level shifted before being input to the AND gates $80_1$-$80_n$, then another level shift occurs at some point between the AND gates $80_1$-$80_n$ and the switching stages $40_1$-$40_n$ (FIG. 4) so that the signals $Switch_{High}$ and $Switch_{Low}$ are compatible with $V_{in}$ and $V_{out}$, which are, respectively, the supply voltage to which the switching stages are coupled and the output voltage generated by the buck converter 60 (FIG. 4).

Furthermore, because the output of the low-pass filter 72 is coupled to the inverting input of the comparator 76 and the output of the low-pass filter 74 is coupled to the non-inverting input node of the comparator, an inverter 96 is coupled between the output of the comparator and the latch 78 so that Enable and Enable_L have the same polarities as described above in conjunction with FIG. 6.

Still referring to FIG. 8, alternate embodiments of the signal-drop-reducing circuit 62 are contemplated. For example, the level shifters 90 and 92 may have other topologies. Moreover, $$\frac{R_4}{R_3 + R_4}$$

may not equal $$\frac{R_6}{R_5 + R_6}.$$

Figure 9:
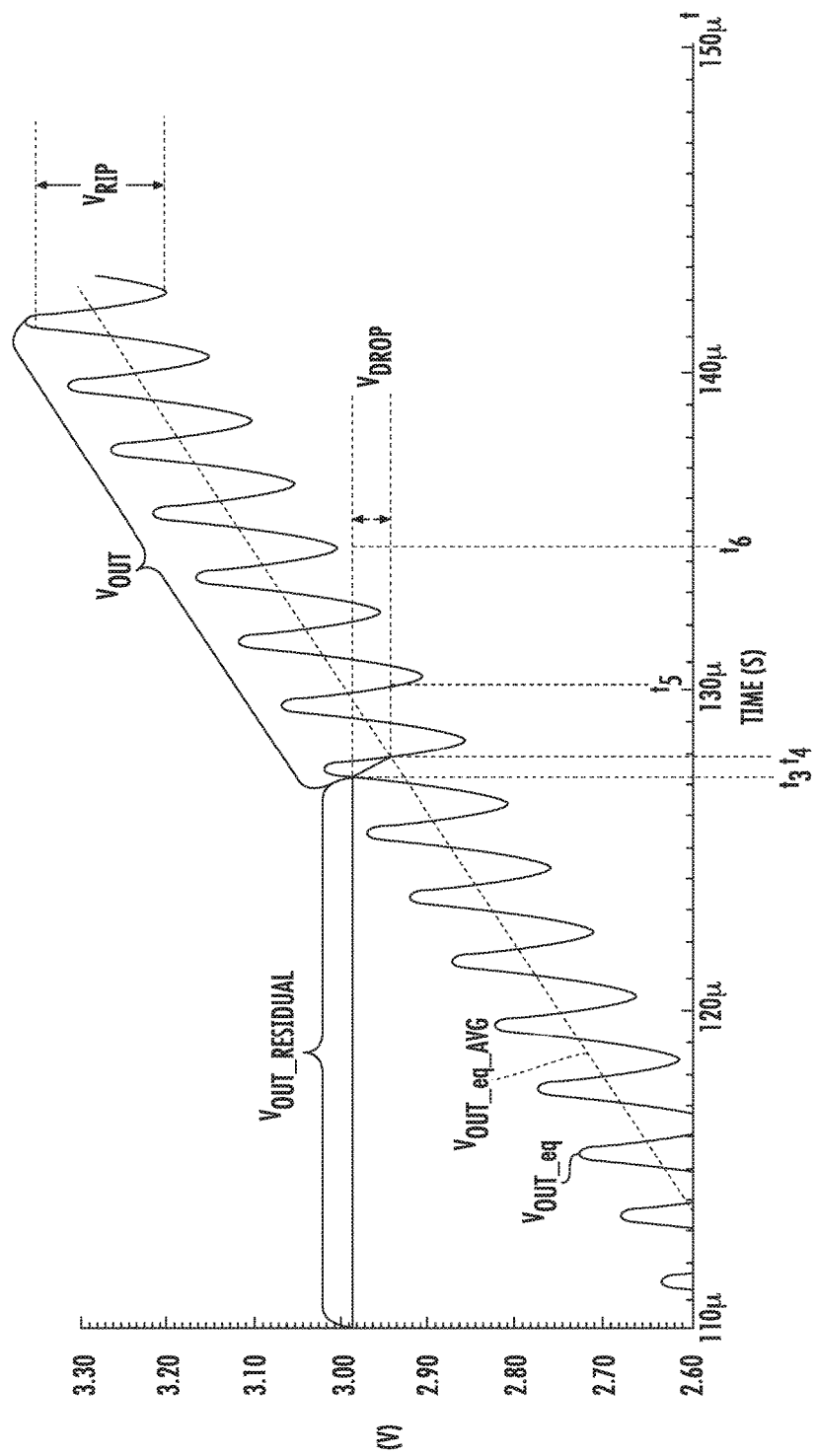
FIG. 9 is a plot of the filtered PWM drive signal generated by the signal-drop-reducing circuit of FIG. 6, and of the supply output voltage generated by the buck converter of FIG. 4, according to another embodiment.

FIG. 9 is an expanded view of a portion of the plot $V_{out\_residual}$ and $V_{out\_eq}$ of FIG. 7, according to an embodiment.

Referring to FIG. 9, a potential problem with the signal-drop-reducing circuit 62 of FIGS. 4, 6, and 8 is described, according to an embodiment.

Ideally, the signal-drop-reducing circuit 62 of FIG. 4 enables the switching stages 40 (also of FIG. 4) in response to at least the average of $V_{out\_eq}$, $V_{out\_eq\_avg}$, being equal to or greater than $V_{out\_residual}$ to prevent a voltage drop in $V_{out}$.

But referring to FIG. 9, and as described above in conjunction with FIGS. 4-7, the comparator 76 transitions the signal Enable to an enable level at the time $t_3$ when the ripple component $V_{rip}$ of $V_{out\_eq}$ exceeds $V_{out\_residual}$.

At the time $t_3$, $V_{out\_eq\_avg}$ is still slightly less than $V_{out\_residual}$, and, therefore, the duty cycle D of $Drive_1$ may still be slightly less than the value needed to prevent a drop in $V_{out\_residual}$ upon enabling the switching stages 40 (FIG. 4).

Consequently, the signal-drop-reducing circuit 62 may still cause a slight drop, $V_{drop}$, in $V_{out}$ from $V_{out\_residual}$.

One technique for reducing or eliminating this slight $V_{drop}$ is for the signal-drop-reducing circuit 62 to enable the switching stages 40 (FIG. 4) only at, or after, a time $t_5$ at which $V_{out\_eq\_avg}$ equals $V_{out\_residual}$.

Figure 10:
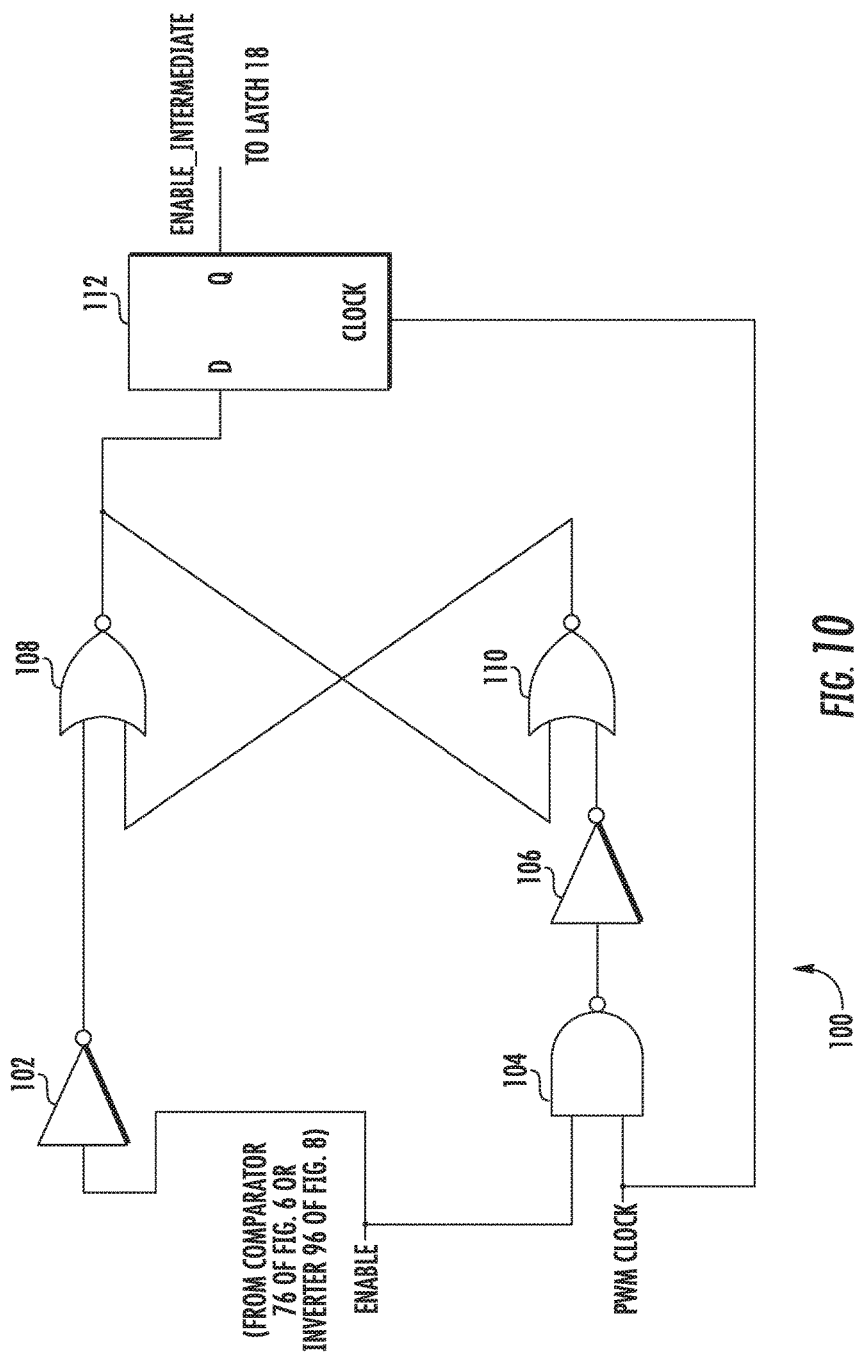
FIG. 10 is a diagram of a circuit that can be included with, or as part of, the signal-drop-reducing circuits of FIGS. 6 and 8 to further reduce, or to eliminate, a drop in the supply output voltage of the buck converter of FIG. 4, according to an embodiment.

FIG. 10 is a diagram of a circuit 100, which, when included in the signal-drop-reducing circuit 62 of FIG. 6 or FIG. 8, causes the latch 78 to generate and to latch the signal Enable_L having an enable level only if the signal Enable attains an enable level while a master PWM clock signal PWM CLOCK is active (e.g., logic 1), and retains this enable level until the next active edge (e.g., rising edge) of PWM CLOCK.

The circuit 100 is effectively coupled between the comparator 76 and the latch 78 of FIG. 6, or between the inverter 96 and the latch 78 of FIG. 8, and includes an inverter 102, a NAND gate 104, an inverter 106, two NOR gates 108 and 110, and a D flip-flop 112. The inverter 102 and an input node of the NAND gate 104 receive the signal Enable from the comparator 76 (or inverter 96), and the other input node of the NAND gate receives PWM CLOCK. And the D flip-flop 112 has a D input (the D input is different from the duty cycle D) coupled to receive the output of the NOR gate 108, has a CLOCK input coupled to receive PWM CLOCK, and has a Q output that provides a signal Enable_Intermediate to the Latch 78.

PWM CLOCK is a master clock signal that has the same period T as the signal $Drive_1$ (and the other signals $Drive_2$-$Drive_n$) per FIG. 5, and, in an embodiment, that has a rising edge that coincides with the rising edge of $Drive_1$.

The circuit 100 operates as follows according to an embodiment in which the disable level of Enable is logic 0 and the enable level of Enable is logic 1.

Initially, Enable has a logic 0 disable level such that the NOR 108 generates a logic 0 output and the circuit 100 generates Enable_Intermediate having a logic 0 disable level.

But if Enable attains a logic 1 enable level while PWM CLOCK has a logic 1 level (i.e., during the positive portion of PWM CLOCK), and maintains this enable level until the next rising edge of PWM CLOCK, then the D flip-flop 112 generates Enable_Intermediate having a logic 1 enable level in response to the next rising edge of PWM CLOCK.

By operating in this manner, the circuit 100 causes Enable_Intermediate, and thus Enable_L (FIGS. 4 and 8) to have an enable level, and, therefore, enables the switching stages 40 (FIG. 4), at a time $t_6$ of FIG. 9 when, even at its lowest point, $V_{out\_eq}$ exceeds $V_{out\_residual}$. That is, at time $t_6$, not only is $V_{out\_eq\_avg}$ greater than $V_{out\_residual}$, but $V_{out\_eq}$ is greater than $V_{out\_residual}$ even at the valleys of $V_{out\_eq}$.

Still referring to FIG. 10, alternate embodiments of the circuit 100 are contemplated. For example, the circuit 100 may have a logic topology other than that described. Furthermore, the combination of the circuit 100 and the comparator 76 of FIG. 6, or the combination of the circuit 100 and the comparator 76 and inverter 96 of FIG. 8, may be referred to as a comparator circuit. Or, the combination of the circuit 100 and the latch 78 of FIGS. 6 and 8 may be referred to as a latch circuit. Alternatively, if the circuit 100 is omitted, the combination of the comparator 76 and the latch 78 may be referred to as a comparator circuit or as a latch circuit. Moreover, the circuit 100 could also be eliminated if the bandwidth of the comparator 76 were low compared to the PWM frequency such that the comparator effectively acts as a low-pass filter that generates an enable signal only when $V_{out\_eq\_av} > V_{out\_residual}$.

Referring to FIGS. 6, 8, and 10, in an embodiment in which the signal-drop-reducing circuit 62 includes the circuit 100 of FIG. 10, the signal-drop-reducing circuit can be configured to further reduce the chances that $V_{out}$ will experience a drop in voltage from $V_{out\_residual}$ upon enabling the switching stages 40 of FIG. 4. For example, the signal-drop-reducing circuit 62 can be configured to enable the switching stages 40 only when at least $Drive_1$ has a high (logic 1) level such that the high-side transistor $52_1$ of the switching stage $40_1$ will be the first of the two transistors in the stage $40_1$ to turn on upon enabling of the switching stage $40_1$.

If the switching stage $40_1$ is enabled when $Drive_1$ has a logic 0 level, then the low-side transistor $54_1$ will turn on and the high-side transistor $52_1$ will remain off.

Because there is no current flowing in the inductor $16_1$, turning on the low-side transistor $54_1$ causes a reverse current to flow from the output node 24, through the inductor $16_1$ and the low-side transistor $54_1$, to ground.

Although this reverse current is likely to be short lived once the high-side transistor $52_1$ turns on in response to $Drive_1$ transitioning to a high level, this reverse current could still cause a slight drop in $V_{out}$.

Consequently, one can configure the signal-drop-reducing circuit 62 so that it does not enable the switching stage $40_1$ until $Drive_1$ is at a high level such that upon the switching stage being enabled, the first transistor to turn on is the high-side transistor $52_1$. Turning on the high-side transistor $52_1$ first causes a forward current, not a reverse current, to flow in the inductor $16_1$, and, therefore, prevents a drop in $V_{out}$ that might otherwise occur if the low-side transistor $54_1$ is turned on first.

Referring to FIGS. 6 and 8, to configure the signal-drop-reducing circuit 62 per the preceding paragraph, one can include delay or other synchronizing circuits (not shown in FIGS. 6 and 8) between the signal $Drive_1$ and the respective input node of the AND gate $80_1$.

Operation of the so-configured signal-drop-reducing circuit 62 is now described, according to an embodiment.

When the signal-drop-reducing circuit 62 includes the circuit 100 of FIG. 10, Enable_Intermediate transitions to a logic 1 enable level on a rising edge of PWM CLOCK, which is coincident with the rising edge of $Drive_1$.

But the logic 1 enable level of Enable_Intermediate endures a delay through, e.g., the latch 78, and possibly other circuitry, before it arrives at the respective input node of the AND gate $80_1$.

Therefore, by the time the logic 1 enable level arrives at the AND gate $80_1$, $Drive_1$ may have already transitioned to a logic 0 low level (which means that it would turn on the low-side transistor $54_1$ upon enabling of the switching stage $40_1$).

But if $Drive_1$ is sufficiently delayed or otherwise synchronized, for example, by the same delay, or by approximately the same delay, that the logic 1 enable level of Enable_Intermediate endures between the D flip-flop 112 and the input of the AND gate $80_1$, then this delayed or otherwise synchronized version of $Drive_1$ will have a logic 1 level when the switching stage $40_1$ is enabled. That is, the delay or other synchronization of $Drive_1$ synchronizes, or approximately synchronizes, the rising edge of Enable_L with the rising edge of $Drive_1$ such that the high-side transistor $52_1$ is the first transistor of the stage $40_1$ turned on upon enabling of the stage, and is turned on for the entire, or almost entire, duration $T_1$ of $Drive_1$ (see FIG. 5).

Because the signals $Drive_2$-$Drive_n$ are out of phase with $Drive_1$, the delays or other synchronizations for each of these other signals Drive may need to be different to make sure that the high-side transistors $52_2$-$52_n$ are the first transistors turned on upon enabling the stages $40_2$-$40_n$, respectively.

Alternatively, $Drive_1$ may be the only one of the signals $Drive_1$-$Drive_n$ delayed or synchronized under the assumption that the forward current generated by the high-side transistor $52_1$ through the inductor $16_1$ is enough to offset any reverse currents generated by the low-side transistors $54_2$-$54_n$ through the inductors $16_2$-$16_n$, respectively.

Figure 11:
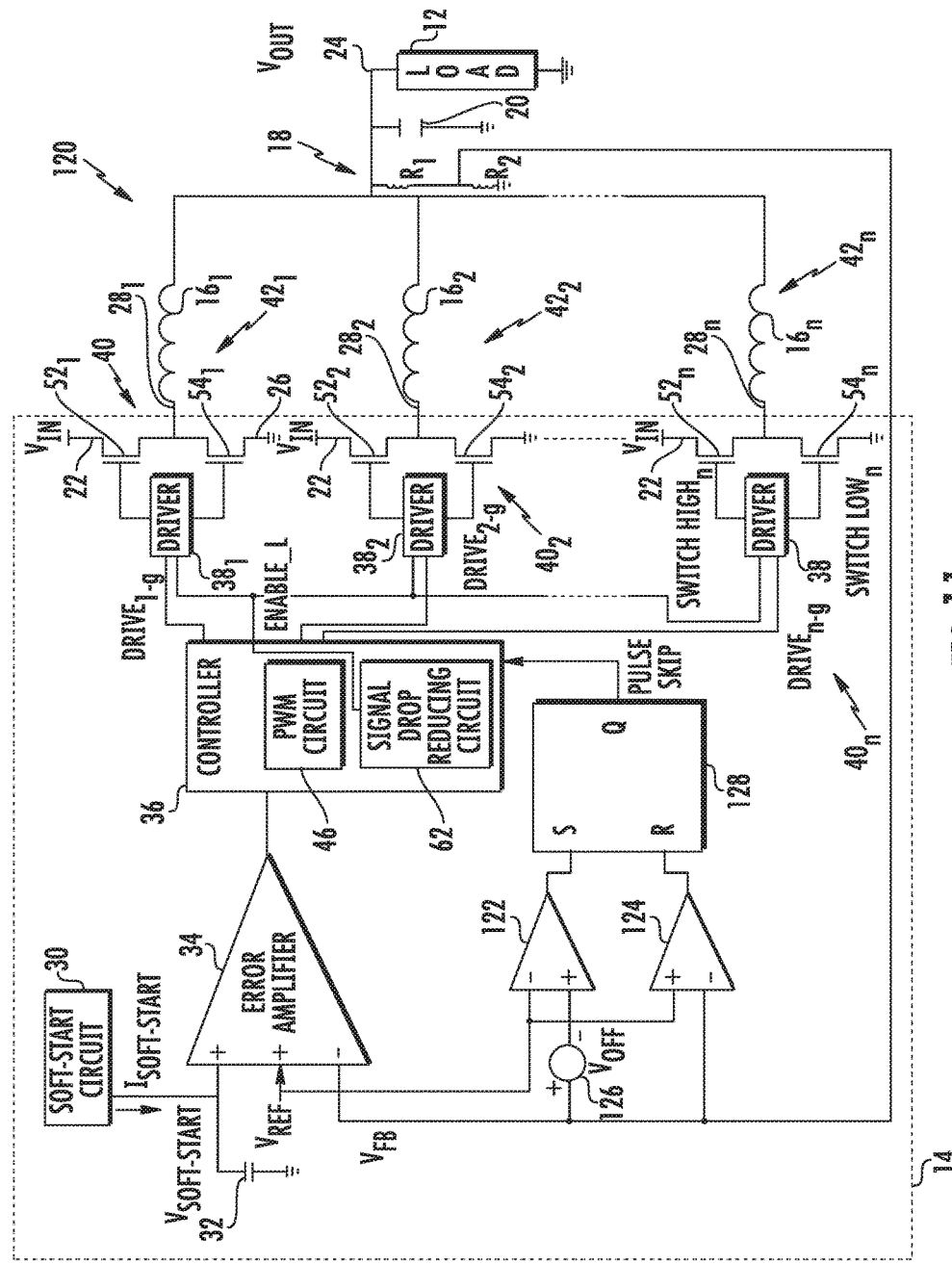
FIG. 11 is a diagram of a buck converter power supply operable in a discontinuous frequency mode (DFM), and of a load powered by the buck converter, according to an embodiment

FIG. 11 is a diagram of a buck converter 120, which is operable in both a CCM and in a Discontinuous Current Mode (DCM), which is described below, according to an embodiment. Components of the buck converter 120 common to the buck converters 10 and 60 of FIGS. 1 and 4, respectively, are labeled with the same reference numbers, and are not further described in conjunction with FIG. 11.

In addition to the components of the buck converter 60 of FIG. 4, the buck converter 120 includes comparators 122 and 124, an offset generator 126 configured to generate a constant (DC) offset voltage $V_{off}$, and an RS flip-flop 128 configured to generate a signal PULSE SKIP.

The comparator 122 has an inverting input node coupled to receive $V_{ref}$, a non-inverting input node coupled to receive a voltage equal to $V_{FB}$-$V_{off}$, and an output node coupled to the set S input of the flip-flop 128.

The comparator 124 has an inverting input node coupled to receive $V_{FB}$, a non-inverting input node coupled to receive $V_{ref}$, and an output node coupled to the reset R input node of the flip-flop 128.

And the flip-flop 128 has a Q output node that provides PULSE SKIP to the controller 36. When the flip-flop 128 is reset, PULSE SKIP equals logic 0, in response to which the controller 36 restarts the buck converter 120. In contrast, when the flip-flop 128 is set, PULSE SKIP equals logic 1, in response to which the controller 36 deactivates the buck converter 120 at least by disabling the switching stages $40_1$-$40_n$.

Typically, the buck converter 120 enters DCM during light-load conditions. The buck converter 120 may itself detect a light-load condition and put itself into DCM, or another circuit, such as the load 12, may put the buck converter into DCM.

During DCM, the buck converter 120 provides a current to the output node 24 periodically, instead of continuously, to increase efficiency.

The operation of the buck converter 120 in DCM is now described, according to an embodiment. In continuous conduction mode (CCM) and in start and restart into CCM, the buck converter 120 is configured to operate according to at least one of the embodiments described above in conjunction with FIGS. 4-10.

First, the buck converter 120 enters DCM from CCM by disabling the switching stages $40_1$-$40_n$ such that the phase nodes 28 present high impedances to the output node 24.

Next, $V_{out}$ is allowed to decay until $V_{FB}$ is less than $V_{ref}$ (the rate of decay is typically slow because the load is light and the filter capacitor has no low-impedance discharge paths as described above in conjunction with FIGS. 1-3).

In response to $V_{FB}$<$V_{ref}$, the comparator 124 transitions its output from a logic 0 to a logic 1 to reset the flip-flop 128, which thus generates PULSE SKIP equal to logic 0.

In response to PULSE SKIP being equal to logic 0, the controller 36 causes the buck converter 120 to restart according to one of the embodiments described above in conjunction with FIGS. 4-10. That is, the controller 36 causes the buck converter 120 to restart in a manner that causes little, or no, voltage drop in $V_{out}$ upon enabling the switching stages $40_1$-$40_n$.

After the signal-drop-reducing circuit 62 enables the switching stages $40_1$-$40_n$, the buck converter 120 causes $V_{out}$ to increase.

The buck converter 120 continues to cause $V_{out}$ to increase until $V_{FB}$ exceeds $V_{ref}$+$V_{off}$, at which time the comparator 122 transitions its output from logic 0 to logic 1 to set the flip-flop 128, which thus generates PULSE SKIP equal to logic 1.

In response to PULSE SKIP being equal to logic 1, the controller 36 disables the switching stages $40_1$-$40_n$.

The buck converter 120 repeats the above procedure such that during DCM, $V_{out}$ oscillates between $$V_{out} = V_{ref} \cdot \frac{R_1 + R_2}{R_2} \text{ and } V_{out} = (V_{ref} + V_{off}) \cdot \frac{R_1 + R_2}{R_2}$$

at a frequency that depends on the load 12.

Still referring to FIG. 11, alternate embodiments of the buck converter 120 are contemplated. For example, because, when the comparator 124 resets the flip-flop 128, $V_{out}$ is only slightly below its regulated value, instead of using $V_{soft\_start}$ as a reference during the restart of the buck converter 120, the error amplifier 34 can be configured to use $V_{ref}$ as the reference from the beginning of the restart procedure to save the time it would take for $V_{soft\_start}$ to reach $V_{ref}$, at which time the error amplifier 34 would switch over to $V_{ref}$ anyway.

Figure 12:
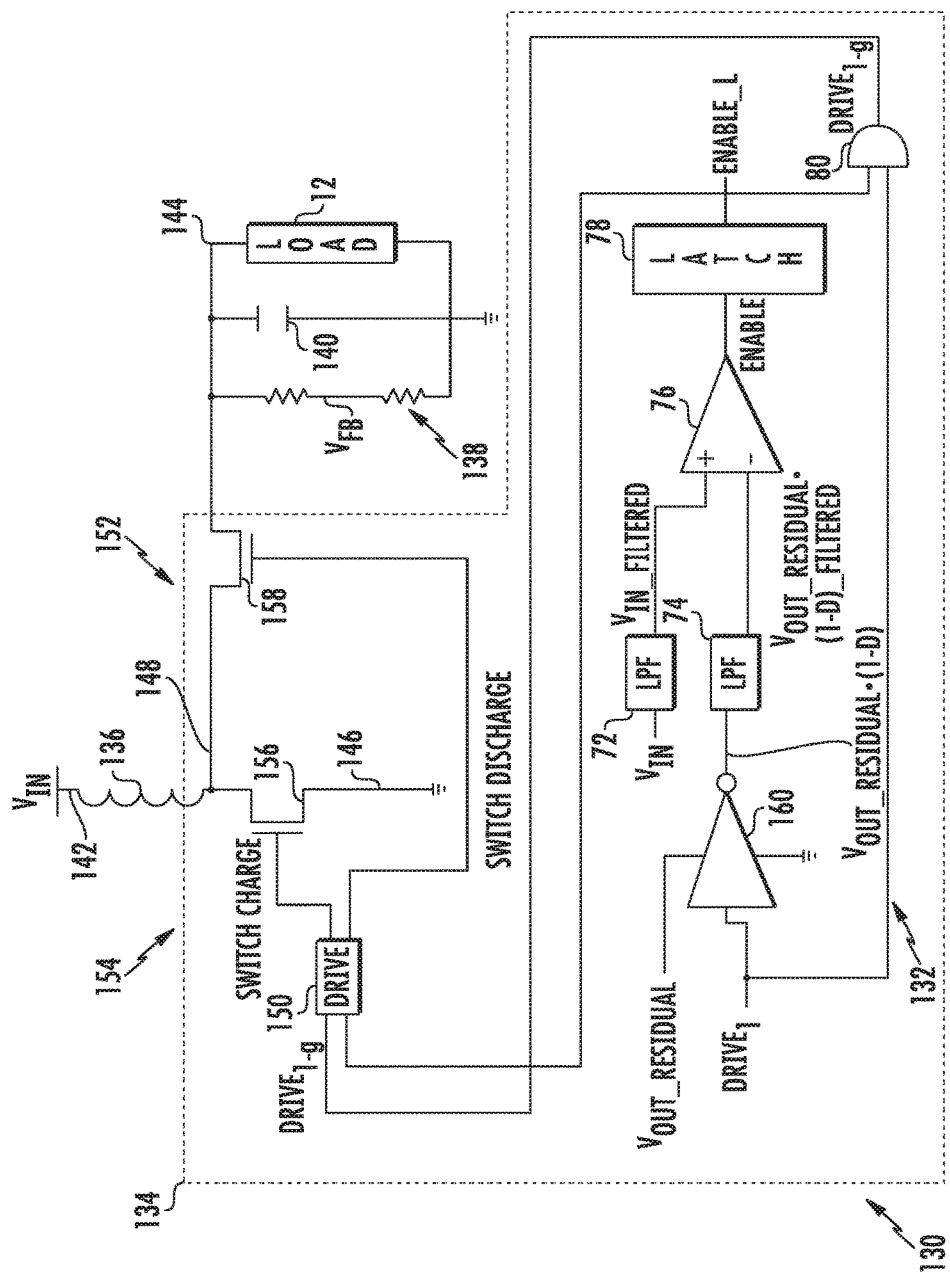
FIG. 12 is a diagram of a boost converter power supply, and of a load powered by the boost converter, according to an embodiment.

FIG. 12 is a diagram of a portion of a boost converter power supply 130, which includes a signal-drop-reducing circuit 132 for reducing or eliminating a drop in $V_{out\text{-}residual}$ on start or restart of the boost converter, according to an embodiment. In FIG. 12, components common to the boost converter 130 and the buck converters 10, 60, and 120 of FIGS. 1, 4, and 11 may be labeled with the same reference numbers, and, for brevity, are not described again. Furthermore, only a portion of the boost converter 130 is described below, the described portion being sufficient to explain the relevant structure, configuration, and operation of the boost converter, it being understood that the other portions of the boost converter may be similar to corresponding portions of the buck converters 10, 60, or 120. Moreover, although the boost converter 130 is described as having a single phase, it may include multiple phases.

In addition to the signal-drop-reducing circuit 132, the boost converter 130 includes a power-supply controller chip 134, a phase inductor 136, an optional feedback resistor-divider circuit 138, an output filter capacitor 140, an input node 142 configured to receive an input voltage $V_{in}$, an output node 144 configured to provide an output voltage $V_{out}$ to the load 12, a reference node 146 configured to receive a reference voltage (here ground), and a phase node 148.

The power-supply controller chip 134 includes soft-start circuitry (not shown in FIG. 12), an error amplifier (not shown in FIG. 12), a controller (not shown in FIG. 12), a switching-stage drive circuit 150, and a switching stage 152. The switching stage 152 and the phase inductor 136 form a respective switching phase circuit 154. And although described as being part of the controller chip 134, the switching stage 152 can be separate from the controller chip.

The drive circuit 150 converts the drive signal Drive$_{1\_g}$ into a pair of signals Switch$_{Charge}$ and Switch$_{Discharge}$ for driving the switching stage 152, where Switch$_{Charge}$= Switch$_{Discharge}$, although in another embodiment, the drive circuit 150 is configured to generate Switch$_{Charge}$ and Switch$_{Discharge}$ so that they are both inactive (e.g., Logic 0) for a period of time to prevent a crowbar current from flowing in the switching stage 152. Furthermore, in response to signal Enable_L having a level of logic 0, the switching stage 152 is disabled and presents high impedance to the output node 144 and to the phase node 148.

The switching stage 152 has an inductor-charging NMOS transistor 156 and an inductor-discharging NMOS transistor 158. In response to $\text{Switch}_{Charge}$=logic 1 (e.g., 3.3 V) and $\text{Switch}_{Discharge}$=logic 0 (e.g., the voltage at the node 148), a linearly increasing current flows from the input node 142, through the inductor 136 and the active charging transistor 156, to the reference node 146 (here ground); because the discharging transistor 158 is inactive, negligible or no current flows to the output node 144. Conversely, in response to $\text{Switch}_{Charge}$=logic 0 and $\text{Switch}_{Discharge}$=logic 1, a linearly decreasing current flows from the input node 142, through the inductor 136 and the active discharging transistor 158, and to the output node 144; because the charging transistor 156 is inactive, negligible or no current flows through the charging transistor. And when $\text{Switch}_{Charge}$=$\text{Switch}_{Discharge}$=logic 0, both transistors 156 and 158 are inactive such that the switching stage 152 is tri-stated, i.e., the switching stage presents a high impedance to the output node 144 and the phase node 148 such that negligible or no currents flows from the output node 144 into the phase node 148 or vice-versa.

The signal-drop-reducing circuit 132 takes advantage of the relationship between D, $V_{in}$, and $V_{out}$, which relationship, for ideal converters, is given by the following equation:

$$V_{out} = V_{in} \cdot \frac{1}{1-D} \qquad (7)$$

where $$D = \frac{T_1}{T}$$

(see FIG. 5) and the boost-converter 130 is operating in CCM.

Although during start or restart of the boost converter 130 equation (7) does not hold because the switching stage 152 presents a high impedance to the output node 144, one can still determine the equivalent output voltage, $V_{out\_eq}$, that the duty cycle D would generate if the switching stage 152 were active, according to the following equation:

$$V_{out\_eq} = V_{in} \cdot \frac{1}{1-D} \qquad (8)$$

That is, $V_{out\_eq}$ is the voltage to which D corresponds while the switching stage 152 is disabled, whereas $V_{out}$ is the voltage to which D corresponds, and which D causes the boost converter 130 to generate on the output node 144, when the switching stage is enabled.

As described below, the signal-drop-reducing circuit 132 takes advantage of equation (8) rearranged as follows:

$$V_{in} = V_{out\_eq} \cdot (1-D) \qquad (9)$$

The structure and configuration of the signal-drop-reducing circuit 132 is now described.

In addition to the first and second low-pass filters 72 and 74, the comparator 76, the latch 78, and the AND gate 80, the signal-drop-reducing circuit 132 includes an inverter 160.

The ideal inverter 160 receives the $\text{Drive}_1$ signal switching at duty cycle D, and due to the inverter 160 having its power rail connected to $V_{out\_residual}$, it generates the inversion, or $\overline{\text{Drive}_1}$ signal switching between $V_{out\_residual}$ and 0 V at duty cycle $\overline{D}$ at its output.

The low-pass filter 72, which is optional, generates $V_{in\_filtered}$ by effectively taking the average of $V_{in}$.

The low-pass filter 74 receives the input signal $V_{out\_residual}$ switching at duty cycle $\overline{D}$ and creates at its output the time average of this signal, which is $V_{out\_residual} \cdot (1-D)$, as shown in equation (9), because the average of the inverse of a signal with duty cycle D is effectively equal to 1−D. As described above in conjunction with FIG. 7, depending on its frequency response, the filter 74 may generate an approximate version of $V_{out\_residual}(1-D)$ with a small ripple voltage.

The comparator 76 compares $V_{in\_filtered}$ from the first low-pass filter 72 ($V_{in\_filtered}=V_{in}$ if the first low-pass filter is omitted) and $V_{out\_residual} \cdot (1-D)$ from the second low-pass filter 74, and generates the signal Enable having a disable value (e.g., logic 0) if $V_{in\_filtered} \leq V_{out\_residual} \cdot (1-D)$ and having an enable value (e.g., logic 1) If $V_{in\_filtered} > V_{out\_residual} \cdot (1-D)$.

The latch 78 latches the signal Enable upon its transition from its disable value (e.g., logic 0) to its enable value (e.g., logic 1) to generate the signal Enable_L, which is the latched version of Enable.

And the AND gate 80, which is optional, generates the gated version $\text{Drive}_{1\_g}$ of the drive signal $\text{Drive}_1$, in response to Enable_L having an enable value; when Enable_L has a disable value, the AND gate generates $\text{Drive}_{1-g}=0$.

Referring to FIG. 12, normal operation of the boost converter 130 in CCM is described, according to an embodiment. The operation of circuitry (e.g., error amplifier, PWM circuit) not specifically described may be similar to the operation of equivalent circuits of the buck converters 10, 60, and 120 of FIGS. 1, 4, and 11.

When $\text{Drive}_{1\_g}$ is logic 1, the drive circuit 150 activates the transistor 156 and deactivates the transistor 158.

In response to the active transistor 156, a linearly increasing charging current flows through the inductor 136 and the transistor 156 to ground.

When $\text{Drive}_{1\_g}$ transitions to logic 0, the drive circuit 150 deactivates the transistor 156 and activates the transistor 158.

In response to the active transistor 158, because a current through an inductor cannot change instantaneously, the current that was flowing through the inductor 136 and the transistor 156 now flows through the inductor and the transistor 158 to the output node 144, and decreases linearly.

The boost converter 130 repeats the above cycle, and the error amplifier (not shown in FIG. 12) adjusts the duty cycle of $\text{Drive}_1$ as needed to maintain $V_{out}$ at its regulated value.

Still referring to FIG. 12, operation of the boost converter 130 during a start or restart (during CCM or DCM) is described, according to an embodiment. The operation of circuitry (e.g., soft-start circuit, error amplifier, PWM circuit) not specifically described may be similar to the operation of equivalent circuits of the buck converters 10, 60, and 120 of FIGS. 1, 4, and 11.

During a start or restart of the boost converter 130, the signal-drop-reducing circuit 132 disables the switching stage 152 until $V_{in\_filtered}$ exceeds $V_{out\_residual} \cdot (1-D)$ such that $V_{out}$ experiences little or no voltage drop from $V_{out\_residual}$ upon enabling of the switching stage. In other aspects, the operation of the boost converter 130 during start or restart may be similar to the operation, during start or restart, of the buck converters 60 of FIG. 4 and 120 of FIG. 11.

Still referring to FIG. 12, alternate embodiments of the boost converter 130 are contemplated. For example, although the signal-drop-reducing circuit 132 is described as generating $V_{out\_residual} \cdot (1-D)$ from the signal Drive$_1$, the signal-drop-reducing circuit can generate $V_{out\_residual} \cdot (1-D)$ from a master PWM signal from which Drive$_1$ is generated. Furthermore, in a multiphase implementation, the phase inductors 136 may be magnetically uncoupled from one another, or two or more of the phase inductors may be magnetically coupled to one another. Moreover, the signal-drop-reducing circuit 132 can include the circuit 100 of FIG. 10 or an equivalent circuit. In addition, the signal-drop-reducing circuit 132 can include a low-pass filter to filter $V_{out\_residual}$ and to provide the filtered $V_{out\text{-}residual}$ to the power node of the inverter 160. In addition, the boost converter 130 can include circuitry similar to the $V_{in}$ and $V_{out\text{-}residual}$ level shifters 90 and 92 of FIG. 8. Furthermore, instead of including two NMOS transistors 156 and 158 as switches, each switching stage 152 may include a PMOS transistor for the charging switch, for the discharging switch, or both the charging and discharging switches.

Figure 13:
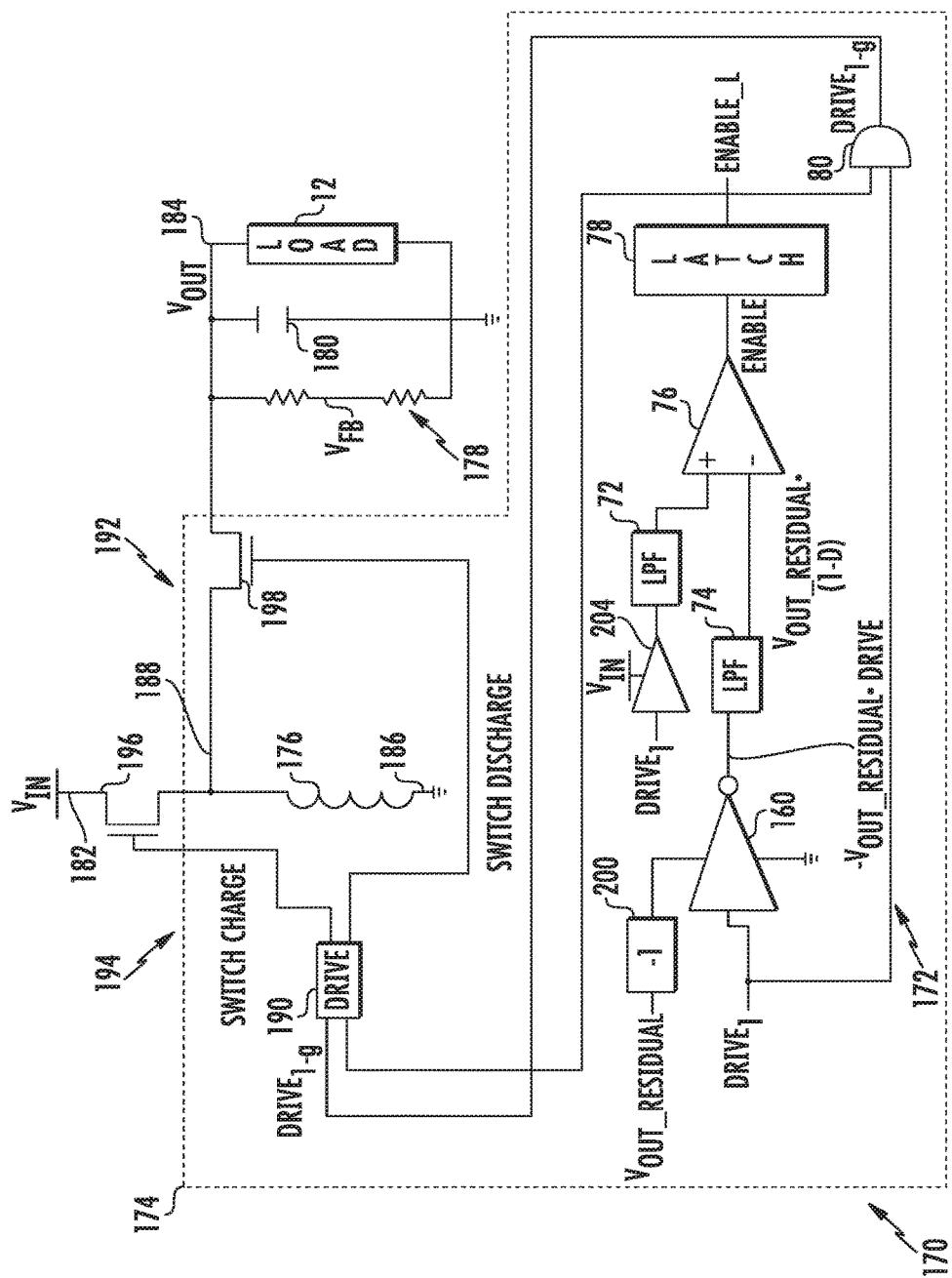
FIG. 13 is a diagram of a buck-boost converter power supply, and of a load powered by the buck-boost converter, according to an embodiment.

FIG. 13 is a diagram of a portion of a buck-boost converter power supply 170, which includes a signal-drop-reducing circuit 172 for reducing or eliminating a drop in $V_{out\text{-}residual}$ on start or restart of the buck-boost converter, according to an embodiment. In FIG. 13, components common to the buck-boost converter 170 and the buck converters 10, 60, and 120 of FIGS. 1, 4, and 11 and the boost converter 130 of FIG. 12 may be labeled with the same reference numbers, and, for brevity, are not described in detail again. Furthermore, only a portion of the buck-boost converter 170 is described below, the described portion being sufficient to explain the relevant structure, configuration, and operation of the buck-boost converter, it being understood that the other portions of the buck-boost converter may be similar to corresponding portions of the buck converters 10, 60, or 120 or the boost converter 130. Moreover, although the buck-boost converter 170 is described as having a single phase, it may include multiple phases.

In addition to the signal-drop-reducing circuit 172, the buck-boost converter 170 includes a power-supply controller chip 174, a phase inductor 176, an optional feedback resistor-divider circuit 178, an output filter capacitor 180, an input node 182 configured to receive an input voltage $V_{in}$, an output node 184 configured to provide an output voltage $V_{out}$, a reference node 186 configured to receive a reference voltage (here ground), and a phase node 188.

The power-supply controller chip 174 includes soft-start circuitry (not shown in FIG. 13), an error amplifier (not shown in FIG. 13), a controller (not shown in FIG. 13), a switching-stage drive circuit 190, and a switching stage 192. The switching stage 192 and the phase inductor 176 form a respective switching phase circuit 194. And although described as being part of the controller chip 174, the switching stage 192 can be separate from the controller chip.

The drive circuit 190 is configured to convert the drive signal Drive$_{1\_g}$ into a pair of signals Switch$_{Charge}$ and Switch$_{Discharge}$ for driving the switching stage 192, where Switch$_{Charge}$=$\overline{\text{Switch}_{Discharge}}$, although in another embodiment, the drive circuit 190 is configured to generate Switch$_{Charge}$ and Switch$_{Discharge}$ so that they are both inactive (e.g., Logic 0) for a period of time to prevent a current from flowing directly between $V_{in}$ and $V_{out}$ as is conventional. Furthermore, in response to signal Enable_L having a level of logic 0, the switching stage 192 is disabled and presents high impedance to the output node 184 and to the phase node 188.

The switching stage 192 has an inductor-charging NMOS transistor 196 and an inductor-discharging NMOS transistor 198. In response to Switch$_{Charge}$=logic 1 (e.g., the voltage at the node 188+3.3 V) and Switch$_{Discharge}$=logic 0 (e.g., the voltage $V_{out}$ at the node 184), a linearly increasing current flows from the input node 182, through the active charging transistor 196 and the inductor 176, to the reference node 186 (here ground); because the discharging transistor 198 is inactive, negligible or no current flows to the output node 184. Conversely, in response to Switch$_{Charge}$=logic 0 and Switch$_{Discharge}$=logic 1, a linearly decreasing current flows from the output node 184, through the active discharging transistor 198 and the inductor 176, to ground; because the charging transistor 196 is inactive, negligible or no current flows through the charging transistor. And when Switch$_{Charge}$=Switch$_{Discharge}$=logic 0, both transistors 196 and 198 are inactive such that the switching stage 192 is tri-stated, i.e., the switching stage presents a high impedance to the output node 184 and the phase node 188 such that negligible or no current flows from the output node 184 into the phase node 188 and vice-versa.

The signal-drop-reducing circuit 172 takes advantage of the relationship between D, $V_{in}$, and $V_{out}$, which relationship, for an ideal buck-boost converter, is given by the following equation:

$$V_{out} = V_{in} \cdot \frac{-D}{1-D} \tag{10}$$

where $$D = \frac{T_1}{T}$$

(see FIG. 5) and the buck-boost converter 170 is operating in CCM.

Although during start or restart of the buck-boost converter 170 equation (10) does not hold because the switching stage 192 presents a high impedance to the output node 184, one can still determine the equivalent output voltage, $V_{out\_eq}$, that the duty cycle D would generate if the switching stage 192 were active, according to the following equation for an ideal buck-boost converter:

$$V_{out\_eq} = V_{in} \cdot \frac{-D}{1-D} \tag{11}$$

That is, $V_{out\_eq}$ is the voltage to which D corresponds when the switching stage 192 is disabled, whereas $V_{out}$ is the voltage to which D corresponds, and which D causes the buck-boost converter 170 to generate on the output node 184, while the switching stage is enabled.

As described below, signal-drop-reducing circuit 172 takes advantage of equation (11) rearranged as follows:

$$V_{in} \cdot D = -V_{out\_eq} \cdot (1-D) \tag{12}$$

The structure and configuration of the signal-drop-reducing circuit 172 is now described.

In addition to the first and second low-pass filters 72 and 74, the comparator 76, the latch 78, the AND gate 80, and the inverter 160, the signal-drop-reducing circuit 172 includes an amplifier 200 with a gain of −1, and a logic buffer 204, which receives $V_{in}$ on a supply node.

The inverter 160 generates the inversion of the Drive$_1$ signal switching between $-V_{out\_residual}$ and 0 V at its output.

The low-pass filter 74 provides at its output the time average of its input, which would be $-V_{out\_residual}\cdot(1-D)$ of equation (12) because the average of the inverse of a signal with duty cycle D is equal to 1−D. As described above in conjunction with FIG. 7, depending on its frequency response, the filter 74 may generate an approximate version of $-V_{out\_residual}\cdot(1-D)$ with a small ripple voltage.

The buffer 204 generates the Drive$_1$ signal at duty cycle D switching between 0 V and $V_{in}$.

The low-pass filter 72 generates $V_{in}\cdot D$ per equation (12) because the average of a signal that switches between 0 V and $V_{in}$ at a duty cycle D is equal to $V_{in}\cdot D$.

The comparator 76 compares $V_{in}\cdot D$ from the first low-pass filter 72 and $-V_{out\_residual}\cdot(1-D)$ from the second low-pass filter 74, and generates the signal Enable having a disable value (e.g., logic 0) if $V_{in}\cdot D \leq -V_{out\_residual}\cdot(1-D)$ and having an enable value (e.g., logic 1) if $V_{in}\cdot D > -V_{out\_residual}\cdot(1-D)$.

The latch 78 latches the signal Enable upon its transition from its disable value (e.g., logic 0) to its enable value (e.g., logic 1) to generate the signal Enable_L, which is the latched version of Enable.

And the AND gate 80, which is optional, generates the gated version Drive$_{1\_g}$ of the drive signal Drive$_1$, in response to Enable_L having an enable value; when Enable_L has a disable value, the AND gate generates Drive$_{1\_g}$=0.

Referring to FIG. 13, normal operation of the buck-boost converter 170 in CCM is described, according to an embodiment. The operation of circuitry (e.g., error amplifier, PWM circuit) not specifically described may be similar to the operation of equivalent circuits of the buck converters 10, 60, or 120 of FIGS. 1, 4, and 11 or of the boost converter 130 of FIG. 12.

When Drive$_{1\_g}$ is logic 1, the drive circuit 190 activates the transistor 196 and deactivates the transistor 198.

In response to the active transistor 196, a linearly increasing charging current flows through the transistor 196 and the inductor 176 to ground.

When Drive$_{1\_g}$ transitions to logic 0, the drive circuit deactivates the transistor 196 and activates the transistor 198.

In response to the active transistor 198, because a current through an inductor cannot change instantaneously, the current that was flowing through the inductor 176 and the transistor 196 now flows from the output node 184, through the transistor 198 and the inductor 176, to ground, and decreases linearly (the polarity of $V_{out}$ is opposite the polarity of $V_{in}$).

The buck-boost converter 170 repeats the above cycle, and the error amplifier (not shown in FIG. 13) adjusts the duty cycle of Drive$_1$ as needed to maintain $V_{out}$ at its regulated value.

Still referring to FIG. 13, operation of the buck-boost converter 170 during a start or restart (during CCM or DCM) is described, according to an embodiment. The operation of circuitry (e.g., soft-start circuit, error amplifier, PWM circuit) not specifically described may be similar to the operation of equivalent circuits of the buck converters 10, 60, or 120 of FIGS. 1, 4, and 11 or of the boost converter 130 of FIG. 12.

During a start or restart of the buck-boost converter 170, the signal-drop-reducing circuit 172 disables the switching stage 192 until $V_{in}\cdot D$ exceeds $-V_{out\_residual}\cdot(1-D)$ such that $V_{out}$ experiences little or no voltage drop from $V_{out\_residual}$ upon enabling of the switching stage. In other aspects, the operation of the buck-boost converter 170 during start or restart may be similar to the operation of the buck converters 60 of FIG. 4 or 120 of FIG. 11 or of the boost converter 130 of FIG. 12.

Still referring to FIG. 13, alternate embodiments of the buck-boost converter 170 are contemplated. For example, although the signal-drop-reducing circuit 172 is described as generating $-V_{out\_residual}\cdot(1-D)$ and $V_{in}\cdot D$ from the signal Drive$_1$, the signal-drop-reducing circuit can generate $-V_{out\_residual}\cdot(1-D)$ and $V_{in}\cdot D$ from a master PWM signal from which Drive$_1$ is generated. Furthermore, in a multiphase implementation, the phase inductors 176 may be magnetically uncoupled from one another, or two or more of the phase inductors may be magnetically coupled to one another. Moreover, the signal-drop-reducing circuit 172 can include the circuit 100 of FIG. 10 or an equivalent circuit. In addition, the signal-drop-reducing circuit can include a low-pass filter to filter $V_{out\_residual}$ and to provide the filtered $V_{out\_residual}$ to the amplifier 200. Furthermore, the buck-boost converter 170 can include circuitry similar to the $V_{in}$ and $V_{out-residual}$ level shifters 90 and 92 of FIG. 8. Moreover, instead of including two NMOS transistors 196 and 198 as switches, each switching stage 192 may include a PMOS transistor for the charging switch, for the discharging switch, or both the charging and discharging switches.

Figure 14:
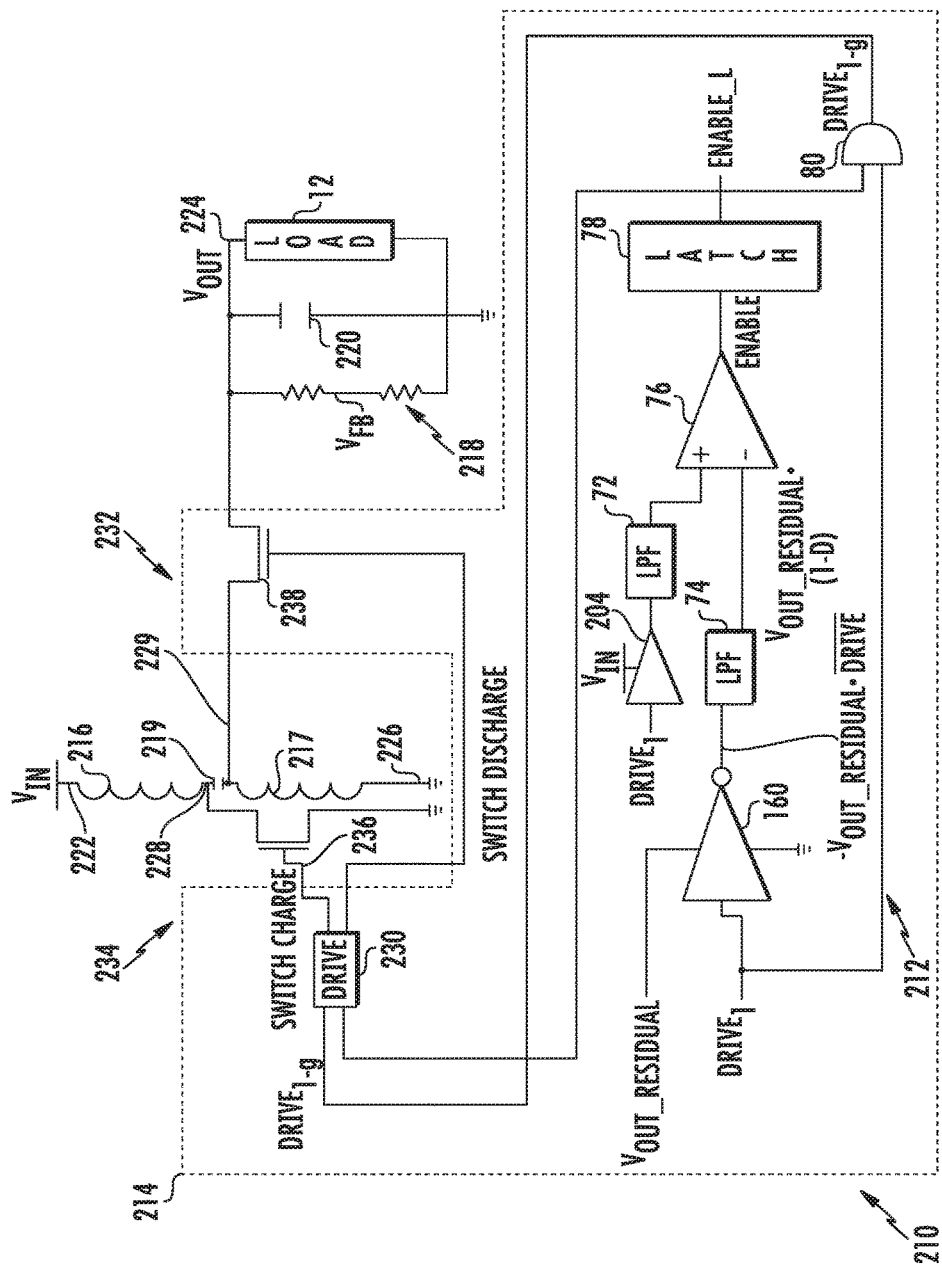
FIG. 14 is a diagram of a single-ended-primary-inductor converter (SEPIC) power supply, and of a load powered by the SEPIC, according to an embodiment.

FIG. 14 is a diagram of a portion of a single-ended primary-inductor converter (SEPIC) 210, which includes a signal-drop-reducing circuit 212 for reducing or eliminating a drop in $V_{out-residual}$ on start or restart of the SEPIC, according to an embodiment. In FIG. 14, components common to the SEPIC 210 and the buck converters 10, 60, and 120 of FIGS. 1, 4, and 11, the boost converter 130 of FIG. 12, and the buck-boost converter 170 of FIG. 13 may be labeled with the same reference numbers, and, for brevity, are not described in detail again. Furthermore, only a portion of the SEPIC 210 is described below, the described portion being sufficient to explain the relevant structure and operation of the SEPIC, it being understood that the other portions of the SEPIC may be similar to corresponding portions of the buck converters 10, 60, or 120, the boost converter 130, or the buck-boost converter 170. Moreover, although the SEPIC 210 is described as having a single phase, it may include multiple phases.

In addition to the signal-drop-reducing circuit 212, the SEPIC 210 includes a power-supply controller chip 214, phase inductors 216 and 217, an optional feedback resistor-divider circuit 218, a phase capacitor 219, an output filter capacitor 220, an input node 222 configured to receive an input voltage $V_{in}$, an output node 224 configured to provide an output voltage $V_{out}$ to the load 12, a reference node 226 configured to receive a reference voltage (here ground), and phase nodes 228 and 229.

The power-supply controller chip 214 includes soft-start circuitry (not shown in FIG. 14), an error amplifier (not shown in FIG. 14), a controller (not shown in FIG. 14), a switching-stage drive circuit 230, and a switching stage 232. The switching stage 232, the phase inductors 216 and 217, and the phase capacitor 219 form a respective switching phase circuit 234. And although described as being part of the controller chip 214, the switching stage 232 can be separate from the controller chip.

The drive circuit 230 is configured to convert the drive signal Drive$_{1\_g}$ into a pair of signals Switch$_{Charge}$ and Switch$_{Discharge}$ for driving the switching stage 232, where Switch$_{Charge}$=$\overline{\text{Switch}_{Discharge}}$, although in another embodiment, the drive circuit 230 is configured to generate Switch$_{Charge}$ and Switch$_{Discharge}$ so that they are both inactive (e.g., Logic 0) for a period of time to prevent a current from flowing from the output node 224 to either V$_{in}$ or ground. Furthermore, in response to signal Enable_L having a level of logic 0, the switching stage 232 is disabled and presents high impedances to the phase nodes 228 and 229 and to the output node 224.

The switching stage 232 has an inductor-charging NMOS transistor 236 and an inductor-discharging NMOS transistor 238. In response to Switch$_{Charge}$=logic 1 (e.g., 3.3 V) and Switch$_{Discharge}$=logic 0 (e.g., the voltage at the node 229) during a first cycle, a linearly increasing current flows from the input node 222, through the phase inductor 216 and the active charging transistor 236, to the reference node 226 (here ground); because the discharging transistor 238 is inactive, negligible or no current flows to the output node 224. Conversely, in response to Switch$_{Charge}$=logic 0 and Switch$_{Discharge}$=logic 1 during the first cycle, a linearly decreasing current flows from the input node 222, through the inductor 216, capacitor 219 (this current generates a voltage across the capacitor), and the active discharging transistor 238, to the output node 224; because the charging transistor 236 is inactive, negligible or no current flows through the charging transistor. In response to Switch$_{Charge}$=logic 1 and Switch$_{Discharge}$=logic 0 during a second and subsequent cycles, because the capacitor 219 now has a voltage across it, a first linearly increasing current flows from the input node 222, through the phase inductor 216 and the active charging transistor 236, to the reference node 226 (here ground), and a second linearly increasing current flows from the reference node, through the second phase inductor 217, capacitor 219, and active charging transistor to the reference node; because the discharging transistor 238 is inactive, negligible or no current flows to the output node 224. Conversely, in response to Switch$_{Charge}$=logic 0 and Switch$_{Discharge}$=logic 1 during the second and subsequent cycles, a first linearly decreasing current flows from the input node 222, through the inductor 216, capacitor 219, and the active discharging transistor 238, to the output node 224, and a second linearly decreasing current flows from the reference node 226, through the second phase inductor 217 and active discharging transistor, to the output node; because the charging transistor 236 is inactive, negligible or no current flows through the charging transistor. And when Switch$_{Charge}$=Switch$_{Discharge}$=logic 0, both transistors 236 and 238 are inactive such that the switching stage 232 is tri-stated, i.e., the switching stage presents a high impedance to the output node 224 and the phase nodes 228 and 229 such that negligible or no current flows from the output node 224 into the phase nodes and vice-versa.

The signal-drop-reducing circuit 212 takes advantage of the relationship between D, V$_{in}$, and V$_{out}$, which relationship, for an ideal SEPIC converter, is given by the following equation:

$$V_{out} = V_{in} \cdot \frac{D}{1-D} \tag{13}$$

where $$D = \frac{T_1}{T}$$

(see FIG. 5) and the SEPIC 210 is operating in CCM.

Although during start or restart of the SEPIC 210 equation (13) does not hold because the switching stage 232 presents a high impedance to the output node 224, one can still determine the equivalent output voltage, V$_{out\_eq}$, that the duty cycle D would generate if the switching stage 232 were active, according to the following equation for an ideal SEPIC converter:

$$V_{out\_eq} = V_{in} \cdot \frac{D}{1-D} \tag{14}$$

That is, V$_{out\_eq}$ is the voltage to which D corresponds when the switching stage 232 is disabled, whereas V$_{out}$ is the voltage to which D corresponds, and which D causes the SEPIC 210 to generate on the output node 224, when the switching stage is enabled.

As described below, signal-drop-reducing circuit 212 takes advantage of equation (14) rearranged as follows:

$$V_{in} \cdot D = V_{out\_eq} \cdot (1-D) \tag{15}$$

The structure and configuration of the signal-drop-reducing circuit 212 is now described.

The signal-drop-reducing circuit 212 is similar to the signal-drop-reducing circuit 172 of FIG. 13, except that the circuit 212 does not include the amplifier 200. That is, the signal-drop-reducing circuit 212 includes the first and second low-pass filters 72 and 74, the comparator 76, the latch 78, the AND gate 80, the inverter 160, and the logic buffer 204.

The inverter 160 generates the signal Drive$_1$ switching between 0 V and V$_{out\_residual}$ at a duty cycle $\overline{D}$.

The low-pass filter 74 converts the output from the inverter 160 into V$_{out\_residual}$·(1−D) from equation (15) because the average of a signal switching between 0 V and V$_{out\_residual}$ at a duty cycle $\overline{D}$ is equal to V$_{out\_residual}$·(1−D). As described above in conjunction with FIG. 7, depending on its frequency response, the filter 74 may generate an approximate version of V$_{out\_residual}$·(1−D) with a small ripple voltage.

The buffer 204 generates the signal Drive$_1$ switching between 0 V and V$_{in}$ at the duty cycle D.

The low-pass filter 72 generates V$_{in}$·D from equation (15) because the average of a 0–V$_{in}$ signal with duty cycle D is effectively equal to V$_{in}$·D.

The comparator 76 compares V$_{in}$·D from the first low-pass filter 72 and V$_{out\_residual}$·(1−D) from the second low-pass filter 74, and generates the signal Enable having a disable value (e.g., logic 0) if V$_{in}$·D≤V$_{out\_residual}$·(1−D) and having an enable value (e.g., logic 1) if V$_{in}$·D>V$_{out\_residual}$·(1−D).

The latch 78 latches the signal Enable upon its transition from its disable value (e.g., logic 0) to its enable value (e.g., logic 1) to generate the signal Enable_L, which is the latched version of Enable.

And the AND gate 80, which is optional, generates the gated version Drive$_{1\_g}$ of the drive signal Drive$_1$, in response to Enable_L having an enable value; when Enable_L has a disable value, the AND gate generates Drive$_{1\_g}$=0.

Referring to FIG. 14, normal operation of the SEPIC 210 in CCM is described, according to an embodiment. The operation of circuitry (e.g., error amplifier, PWM circuit) not specifically described may be similar to the operation of equivalent circuits of the buck converters 10, 60, or 120 of FIGS. 1, 4, and 11, of the boost converter 130 of FIG. 12, or of the buck-boost converter 170 of FIG. 13. Furthermore, the description is limited to the second and subsequent PWM cycles after starting of the SEPIC 210.

When $Drive_{1\_g}$ is logic 1, the drive circuit 230 activates the transistor 236 and deactivates the transistor 238.

In response to the active transistor 236, a first linearly increasing charging current flows through the transistor 236 and the first phase inductor 216 to ground, and a second linearly increasing charging current flows from ground, through the second phase inductor 217 and phase capacitor 219, through the transistor 236, to ground.

When $Drive_{1\_g}$ transitions to logic 0, the drive circuit 230 deactivates the transistor 236 and activates the transistor 238.

In response to the active transistor 238, because a current through an inductor cannot change instantaneously, the current that was flowing through the first phase inductor 216 and the transistor 236 now flows through the first phase inductor, the phase capacitor 219, and the transistor 238 to the output node 224, and the current that was flowing through the second phase inductor 217 and the transistor 236 now flows through the second phase inductor and the transistor 238 to the output node; both of these currents decrease linearly. And it is noted that during the first PWM cycle, there is no current flowing through the second phase inductor 217.

The SEPIC 210 repeats the above cycle, and the error amplifier (not shown in FIG. 14) adjusts the duty cycle of $Drive_1$ as needed to maintain $V_{out}$ at its regulated value.

Still referring to FIG. 14, operation of the SEPIC 210 during a start or restart (during CCM or DCM) is described, according to an embodiment. The operation of circuitry (e.g., soft-start circuit, error amplifier, PWM circuit) not specifically described may be similar to the operation of equivalent circuits of the buck converters 10, 60, or 120 of FIGS. 1, 4, and 11, of the boost converter 130 of FIG. 12, or of the buck-boost converter 170 of FIG. 13.

During a start or restart of the SEPIC 210, the signal-drop-reducing circuit 212 disables the switching stage 232 until $V_{in} \cdot D$ exceeds $V_{out\_residual} \cdot (1-D)$ such that $V_{out}$ experiences little or no voltage drop from $V_{out\_residual}$ upon enabling of the switching stage. In other aspects, the operation of the SEPIC 210 during start or restart may be similar to the operation of the buck converters 60 of FIG. 4 or 120 of FIG. 11, of the boost converter 130 of FIG. 12, or of the buck-boost converter 170 of FIG. 13.

Still referring to FIG. 14, alternate embodiments of the SEPIC 210 are contemplated. For example, although the signal-drop-reducing circuit 212 is described as generating $V_{out\_residual} \cdot (1-D)$ and $V_{in} \cdot D$ from the signal $Drive_1$, the signal-drop-reducing circuit can generate $V_{out\_residual} \cdot (1-D)$ and $V_{in} \cdot D$ from a master PWM signal from which $Drive_1$ is generated. Furthermore, in a multiphase implementation, the phase inductors 216 and 217 may be magnetically uncoupled from one another, or two or more of the phase inductors may be magnetically coupled to one another. Moreover, the signal-drop-reducing circuit 212 can include the circuit 100 of FIG. 10 or an equivalent circuit. In addition, the signal-drop-reducing circuit 212 can include a low-pass filter to filter $V_{out\_residual}$ and to provide the filtered $V_{out\_residual}$ to the supply node of the inverter 160. Furthermore, the SEPIC 210 can include circuitry similar to the $V_{in}$ and $V_{out\_residual}$ level shifters 90 and 92 of FIG. 8. Moreover, instead of including two NMOS transistors 236 and 238 as switches, each switching stage 232 may include a PMOS transistor for the charging switch, for the discharging switch, or both the charging and discharging switches.

Figure 15:
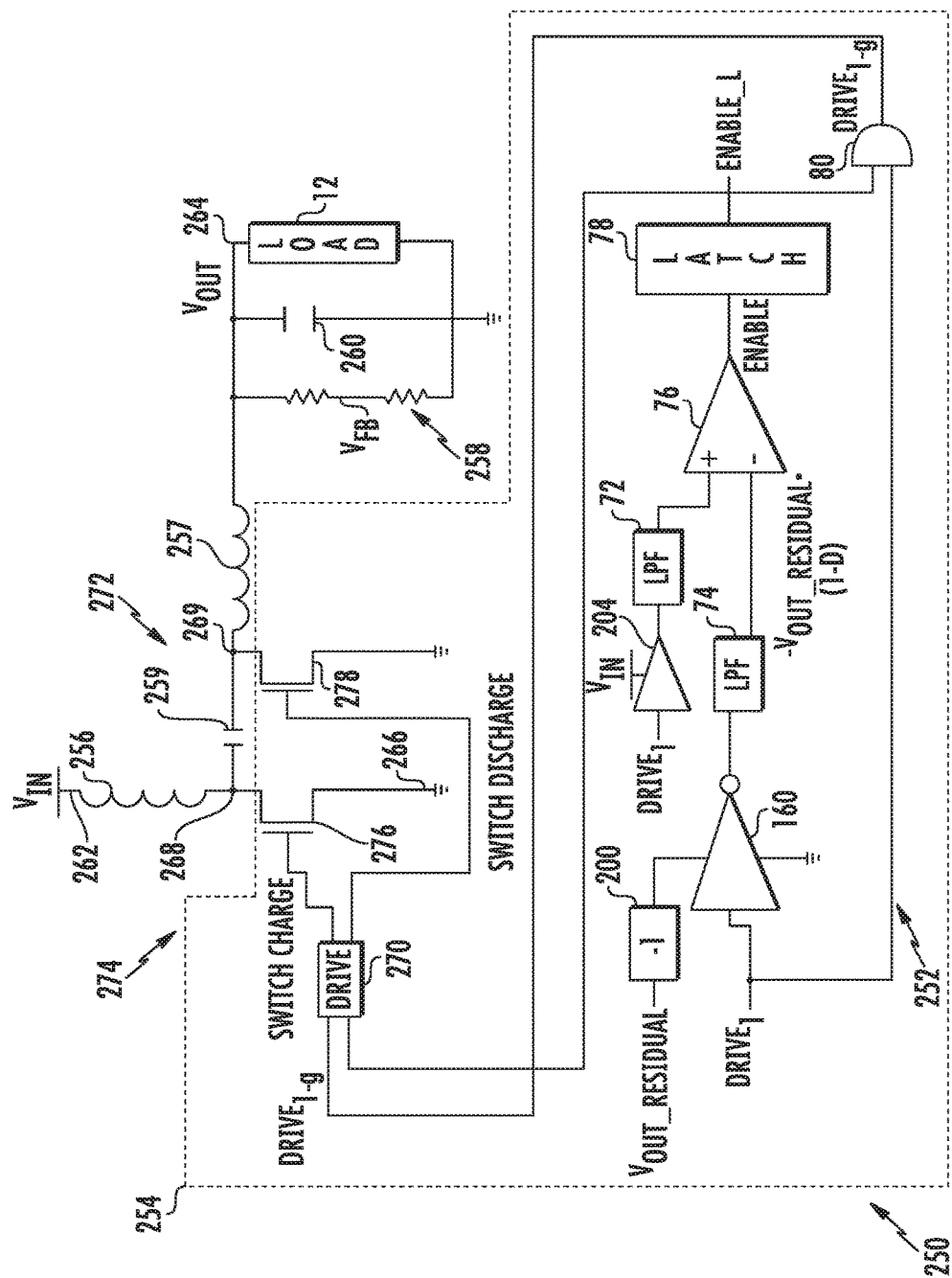
FIG. 15 is a diagram of a ĆUK converter power supply, and of a load powered by the ĆUK converter, according to an embodiment.

FIG. 15 is a diagram of a portion of a Ćuk (pronounced "chuk") converter 250, which includes a signal-drop-reducing circuit 252 for reducing or eliminating a drop in $V_{out\_residual}$ on start or restart of the Ćuk converter, according to an embodiment. In FIG. 15, components common to the Ćuk converter 250 and the buck converters 10, 60, and 120 of FIGS. 1, 4, and 11, the boost converter 130 of FIG. 12, the buck-boost converter 170 of FIG. 13, and the SEPIC 210 of FIG. 14 may be labeled with the same reference numbers, and, for brevity, are not described again in detail. Furthermore, only a portion of the Ćuk converter 250 is described below, the described portion being sufficient to explain the relevant structure and operation of the Ćuk converter, it being understood that the other portions of the Ćuk converter may be similar to corresponding portions of the buck converters 10, 60, or 120, the boost converter 130, the buck-boost converter 170, or the SEPIC 210. Moreover, although the Ćuk converter 250 is described as having a single phase, it may include multiple phases.

In addition to the signal-drop-reducing circuit 252, the Ćuk converter 250 includes a power-supply controller chip 254, phase inductors 256 and 257, an optional feedback resistor-divider circuit 258, a phase capacitor 259, an output filter capacitor 260, an input node 262 configured to receive an input voltage $V_{in}$, an output node 264 configured to provide an output voltage $V_{out}$, a reference node 266 configured to receive a reference voltage (here ground), and phase nodes 268 and 269.

The power-supply controller chip 254 includes soft-start circuitry (not shown in FIG. 15), an error amplifier (not shown in FIG. 15), a controller (not shown in FIG. 15), a switching-stage drive circuit 270, and a switching stage 272. The switching stage 272, the phase inductors 256 and 257, and the phase capacitor 259 form a respective switching phase circuit 274. And although described as being part of the controller chip 254, the switching stage 272 can be separate from the controller chip.

The drive circuit 270 is configured to convert the drive signal $Drive_{1\_g}$ into a pair of signals $Switch_{Charge}$ and $Switch_{Discharge}$ for driving the switching stage 272, where $Switch_{Charge} = \overline{Switch_{Discharge}}$, although in another embodiment, the drive circuit 270 is configured to generate $Switch_{Charge}$ and $Switch_{Discharge}$ so that they are both inactive (e.g., Logic 0) for a period of time to prevent a current from flowing from the output node 264 to $V_{in}$ or ground. Furthermore, in response to signal Enable_L having a level of logic 0, the switching stage 272 is disabled and presents high impedances to the phase nodes 268 and 269 and to the output node 264.

The switching stage 272 has an inductor-charging NMOS transistor 276 and an inductor-discharging NMOS transistor 278. In response to $Switch_{Charge}$=logic 1 (e.g., 3.3 V) and $Switch_{Discharge}$=logic 0 (e.g., the voltage at the node 269) during a first cycle, a linearly increasing current flows from the input node 262, through the phase inductor 256 and the active charging transistor 276, to the reference node 266 (here ground); because the discharging transistor 278 is inactive, negligible or no current flows through the discharging transistor. Conversely, in response to $Switch_{Charge}$=logic 0 and $Switch_{Discharge}$=logic 1 during the first cycle, a linearly decreasing current flows from the input node 262, through the inductor 256, capacitor 259 (this current generates a voltage across the capacitor), and the active discharging transistor 278, to ground; because the charging transistor 276 is inactive, negligible or no current flows through the charging transistor. In response to Switch$_{Charge}$=logic 1 and Switch$_{Discharge}$=logic 0 during a second and subsequent cycles, because the capacitor 259 now has a voltage across it, a first linearly increasing current flows from the input node 262, through the phase inductor 256 and the active charging transistor 276, to the reference node 226 (here ground), and a second linearly increasing current flows from the output node 264, through the second phase inductor 257, capacitor 259, and active charging transistor to the reference node; because the discharging transistor 278 is inactive, negligible or no current flows through the discharging transistor. Conversely, in response to Switch$_{Charge}$=logic 0 and Switch$_{Discharge}$=logic 1 during the second and subsequent cycles, a first linearly decreasing current flows from the input node 262, through the inductor 256, capacitor 259, and the active discharging transistor 278, to the reference node 266, and a second linearly decreasing current flows from the output node 264, through the second phase inductor 257 and active discharging transistor, to the reference node; because the charging transistor 276 is inactive, negligible or no current flows through the charging transistor. And when Switch$_{Charge}$=Switch$_{Discharge}$=logic 0, both transistors 276 and 278 are inactive such that the switching stage 272 is tri-stated, i.e., the switching stage presents high impedances to the output node 264 and the phase nodes 268 and 269 such that negligible or no current flows from the output node 264 into the phase nodes or vice-versa (the phase capacitor 259 also acts to prevent a DC current from flowing to or from the output node while the switching stage is disabled).

The signal-drop-reducing circuit 252 takes advantage of the relationship between D, V$_{in}$, and V$_{out}$, which relationship, for an ideal Ćuk converter, is given by the following equation:

$$V_{out} = V_{in} \cdot \frac{-D}{1-D} \quad (16)$$

where $$D = \frac{T_1}{T}$$

(see FIG. 5) and the Ćuk converter 250 is operating in CCM.

Although during start or restart of the Ćuk converter 250 equation (16) does not hold because the switching stage 272 presents a high impedance to the output node 264, one can still determine the equivalent output voltage, V$_{out\_eq}$, that the duty cycle D would generate if the switching stage 272 were active, according to the following equation for an ideal Ćuk converter:

$$V_{out\_eq} = V_{in} \cdot \frac{-D}{1-D} \quad (17)$$

That is, V$_{out\_eq}$ is the voltage to which D corresponds when the switching stage 272 is disabled, whereas V$_{out}$ is the voltage to which D corresponds, and which D causes the Ćuk converter 250 to generate on the output node 264, when the switching stage is enabled.

As described below, signal-drop-reducing circuit 252 takes advantage of equation (17) rearranged as follows:

$$V_{in} \cdot D = -V_{out\_eq} \cdot (1-D) \quad (18)$$

The structure and configuration of the signal-drop-reducing circuit 252 is now described.

The signal-drop-reducing circuit 252 is similar to the signal-drop-reducing circuit 172 of FIG. 13. That is, the signal-drop-reducing circuit 252 includes the first and second low-pass filters 72 and 74, the comparator 76, the latch 78, the AND gate 80, the inverter 160, the amplifier 200, and the buffer 204.

The inverter 160 generates the inversion of the signal Drive$_1$, which transitions between 0 V and −V$_{out\_residual}$ at a duty cycle D.

The low-pass filter 74 converts the signal output from the inverter 160 into −V$_{out\_residual}$·(1−D) of equation (18) because the average of the inverse of a 0-−V$_{out\_residual}$ signal with duty cycle D is effectively equal to −V$_{out\_residual}$·(1−D). As described above in conjunction with FIG. 7, depending on its frequency response, the filter 74 may generate an approximate version of −V$_{out\_residual}$·(1−D) with a small ripple voltage.

The buffer 204 generates the signal Drive$_1$ switching between 0 V and V$_{in}$ at the duty cycle D.

The low-pass filter 72 generates V$_{in}$·D of equation (18) because the average of a 0-V$_{in}$ signal with duty cycle D is effectively equal to V$_{in}$·D.

The comparator 76 compares V$_{in}$·D from the first low-pass filter 72 and −V$_{out\_residual}$·(1−D) from the second low-pass filter 74, and generates the signal Enable having a disable value (e.g., logic 0) if V$_{in}$·D≤−V$_{out\_residual}$·(1−D) and having an enable value (e.g., logic 1) if V$_{in}$·D>−V$_{out\_residual}$·(1−D) (the Ćuk converter 250 generates V$_{out}$ having the opposite polarity relative to V$_{in}$).

The latch 78 latches the signal Enable upon its transition from its disable value (e.g., logic 0) to its enable value (e.g., logic 1) to generate the signal Enable_L, which is the latched version of Enable.

And the AND gate 80, which is optional, generates the gated version Drive$_{1\_g}$ of the drive signal Drive$_1$, in response to Enable_L having an enable value; when Enable_L has a disable value, the AND gate generates Drive$_{1-g}$=0.

Referring to FIG. 15, normal operation of the Ćuk converter 250 in CCM is described, according to an embodiment. The operation of circuitry (e.g., error amplifier, PWM circuit) not specifically described may be similar to the operation of equivalent circuits of the buck converters 10, 60, or 120 of FIGS. 1, 4, and 11, of the boost converter 130 of FIG. 12, of the buck-boost converter 170 of FIG. 13, or of the SEPIC 210 of FIG. 14. Furthermore, the description is limited to the second and subsequent PWM cycles after starting of the Ćuk converter 250.

When Drive$_{1\_g}$ is logic 1, the drive circuit 270 activates the transistor 276 and deactivates the transistor 278.

In response to the active transistor 276, a first linearly increasing charging current flows through the transistor 276 and the first phase inductor 256 to ground, and a second linearly increasing charging current flows from the output node 264, through the second phase inductor 257, phase capacitor 259, and transistor 236, to ground.

When Drive$_{1\_g}$ transitions to logic 0, the drive circuit 270 deactivates the transistor 276 and activates the transistor 278.

In response to the active transistor 278, because a current through an inductor cannot change instantaneously, the current that was flowing through the first phase inductor 256 and the transistor 276 now flows through the first phase inductor, the phase capacitor 259, and the transistor 278 to ground, and the current that was flowing through the second phase inductor 257, phase capacitor 259, and transistor 276 now flows through the second phase inductor and the transistor 278 to ground; both of these currents decrease linearly. And it is noted that during the first PWM cycle, there is no current flowing through the second phase inductor 257.

The Ćuk converter 250 repeats the above cycle, and the error amplifier (not shown in FIG. 15) adjusts the duty cycle of Drive$_1$ as needed to maintain V$_{out}$ at its regulated value.

Still referring to FIG. 15, operation of the Ćuk converter 250 during a start or restart (during CCM or DCM) is described, according to an embodiment. The operation of circuitry (e.g., soft-start circuit, error amplifier, PWM circuit) not specifically described may be similar to the operation of equivalent circuits of the buck converters 10, 60, or 120 of FIGS. 1, 4, and 11, of the boost converter 130 of FIG. 12, of the buck-boost converter 170 of FIG. 13, or of the SEPIC 210 of FIG. 14.

During a start or restart of the Ćuk converter 250, the signal-drop-reducing circuit 252 disables the switching stage 272 until V$_{in}$·D exceeds −V$_{out\_residual}$'(1−D) such that V$_{out}$ experiences little or no voltage drop from V$_{out\_residual}$ upon enabling of the switching stage. In other aspects, the operation of the Ćuk converter 250 during start or restart may be similar to the operation of the buck converters 60 of FIG. 4 or 120 of FIG. 11, of the boost converter 130 of FIG. 12, of the buck-boost converter 170 of FIG. 13, or of the SEPIC 210 of FIG. 14.

Still referring to FIG. 15, alternate embodiments of the Ćuk converter 250 are contemplated. For example, although the signal-drop-reducing circuit 252 is described as generating −V$_{out\_residual}$'(1−D) and V$_{in}$·D from the signal Drive$_1$, the signal-drop-reducing circuit can generate −V$_{out\_residual}$'(1−D) and V$_{in}$·D from a master PWM signal from which Drive$_1$ is generated. Furthermore, in a multiphase implementation, the phase inductors 256 and 257 may be magnetically uncoupled from one another, or two or more of the phase inductors may be magnetically coupled to one another. Moreover, the signal-drop-reducing circuit 252 can include the circuit 100 of FIG. 10 or an equivalent circuit. In addition, the signal-drop-reducing circuit 252 can include a low-pass filter to filter V$_{out\_residual}$ and to provide the filtered V$_{out\_residual}$ to the amplifier 200. Furthermore, the Ćuk converter 250 can include circuitry similar to the V$_{in}$ and V$_{out\_residual}$ level shifters 90 and 92 of FIG. 8. Moreover, instead of including two NMOS transistors 276 and 278 as switches, each switching stage 272 may include a PMOS transistor for the charging switch, for the discharging switch, or both the charging and discharging switches.

Figure 16:
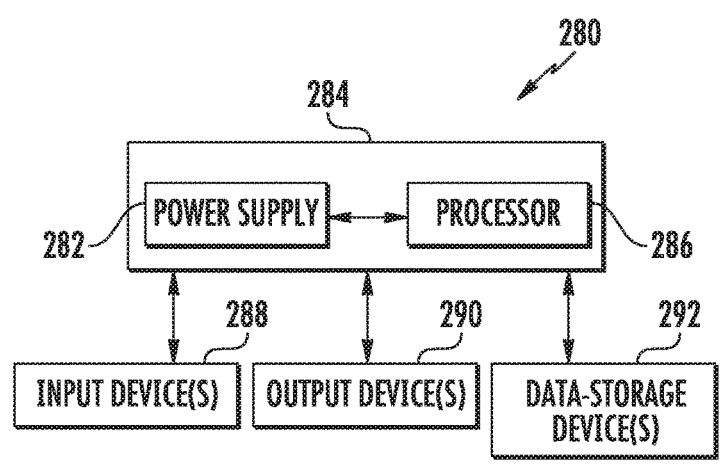
FIG. 16 is a diagram of a system that incorporates at least one of the power supplies of FIGS. 4 and 11-15, according to an embodiment.

FIG. 16 is a block diagram of an embodiment of a computer system 280, which incorporates, as a power supply 282, one or more of the buck converters of FIGS. 4 and 11, the boost converter 130 of FIG. 12, the buck-boost converter 170 of FIG. 13, the SEPIC 210 of FIG. 14, or the Ćuk converter 250 of FIG. 16, according to an embodiment. Although the system 280 is described as a computer system, it may be any system for which an embodiment of the power supply 282 is suited.

The system 280 includes computing circuitry 284, which, in addition to the power supply 282, includes a processor 286 (e.g., a microprocessor or microcontroller) powered by the supply (i.e., the processor is a load of the supply), at least one input device 288, at least one output device 290, and at least one data-storage device 292.

In addition to processing data, the processor 286 may program or otherwise control the power supply 282. For example, one or more of the functions of the power-supply controller of the power supply may be performed by the processor 286.

The input device (e.g., keyboard, mouse) 288 allows the providing of data, programming, and commands to the computing circuitry 284.

The output device (e.g., display, printer, speaker) 290 allows the computing circuitry 284 to provide data in a form perceivable by a human operator.

And the data-storage device (e.g., flash drive, hard disk drive, RAM, optical drive) 292 allows for the storage of, e.g., programs and data.

Still referring to FIG. 16, although described as powering the processor 286, the power supply 282 may provide power to one or more other components of the system 280 instead of, or in addition to, the processor. Furthermore, one or more components (e.g., the power-supply controller) of the power supply 282 may be disposed on a same integrated circuit die as other components (e.g., the processor 286) of the system 280.

EXAMPLE EMBODIMENTS

Example 1 includes a power-supply controller, comprising: a control circuit configured to generate a drive signal having a duty cycle; a drive circuit configured to cause a phase circuit of a power supply to generate, in response to the drive signal, an output signal having a magnitude; and a signal-drop-reducing circuit configured to disable the drive circuit in response to the duty cycle corresponding to a signal magnitude that is lower than the magnitude of the output signal.

Example 2 includes the power-supply controller of Example 1 wherein the control circuit includes a modulator circuit configured to generate the drive signal by modulating a pulse width of the drive signal.

Example 3 includes the power-supply controller of any of Examples 1-2 wherein the drive circuit includes: a non-inverting buffer circuit having a first input node configured to receive the drive signal and having a first output node configured to be coupled to the phase circuit, the non-inverting buffer configured to cause the first output node to have a high impedance state in response to the signal-drop-reducing circuit disabling the drive circuit; and an inverting buffer circuit having a second input node configured to receive the drive signal and having a second output node configured to be coupled to the phase circuit, the inverting buffer configured to cause the second output node to have a high impedance state in response to the signal-drop-reducing circuit disabling the drive circuit.

Example 4 includes the power-supply controller of any of Examples 1-3 wherein the signal-drop-reducing circuit includes a comparator circuit configured to compare a magnitude of a representative signal related to the output signal to the signal magnitude and to disable the drive circuit in response to the magnitude of the representative signal being less than the signal magnitude.

Example 5 includes the power-supply controller of any of Examples 1-4 wherein the signal-drop-reducing circuit includes: a low-pass filter configured to generate, in response to the drive signal, a filtered version of the drive signal, the signal magnitude equaling an amplitude of the filtered version of the drive signal; and a comparator circuit configured to compare a representative signal related to the output signal to the filtered version of the drive signal, to disable the drive circuit in response to a magnitude of the representative signal being greater than the amplitude of the filtered version of the drive signal, and to enable the drive circuit in response to the magnitude of the representative signal being less than the amplitude of the filtered version of the drive signal.

Example 6 includes the power-supply controller of any of Examples 1-5 wherein the signal-drop-reducing circuit includes: a first low-pass filter configured to generate, in response to the drive signal, a filtered version of the drive signal, the signal magnitude equaling an amplitude of the filtered version of the drive signal; a second low-pass filter configured to generate, in response to the output signal, a filtered version of the output signal, the magnitude of the output signal equaling an amplitude of the filtered version of the output signal; and a comparator circuit configured to compare the filtered version of the output signal to the filtered version of the drive signal, to disable the drive circuit in response to the amplitude of the filtered version of the output signal being greater than the amplitude of the filtered version of the drive signal, and to enable the drive circuit in response to the amplitude of the filtered version of the output signal being less than the amplitude of the filtered version of the drive signal.

Example 7 includes the power-supply controller of any of Examples 1-6 wherein the signal-drop-reducing circuit includes: a comparator configured to compare a representative signal related to the output signal to the signal magnitude, to generate a comparator signal having a disable value in response to a magnitude of the representative signal being greater than the signal magnitude, and to generate the comparator signal having an enable value in response to the magnitude of the representative signal being less than the signal magnitude; and a latch configured to provide a latched comparator signal to the drive circuit and to latch the comparator signal in response to the comparator signal transitioning to an enable value.

Example 8 includes the power-supply controller of any of Examples 1-7 wherein the signal-drop-reducing circuit includes: a low-pass filter configured to generate, in response to the drive signal, a filtered version of the drive signal, the signal magnitude equaling an average amplitude of the filtered version of the drive signal; and a comparator circuit configured to compare a representative signal related to the output signal to the filtered version of the drive signal, to disable the drive circuit in response to a magnitude of the representative signal being greater than the average amplitude of the filtered version of the drive signal, and to enable the drive circuit in response to the magnitude of the representative signal being less than the average amplitude of the filtered version of the drive signal.

Example 9 includes the power-supply controller of any of Examples 1-8 wherein the signal-drop-reducing circuit includes: a comparator configured to compare a representative signal related to the output signal to the signal magnitude, to generate a comparator signal having a disable value in response to a magnitude of the representative signal being greater than the signal magnitude, and to generate the comparator signal having an enable value in response to the magnitude of the representative signal being less than the signal magnitude; a latch circuit configured to provide the comparator signal to the drive circuit and to latch the comparator signal in response to the comparator signal transitioning to the enable value and maintaining the enable value for at least one full period of the drive signal.

Example 10 includes the power-supply controller of any of Examples 1-9 wherein the signal-drop-reducing circuit includes: a comparator configured to compare a representative signal related to the output signal to the signal magnitude, to generate a comparator signal having a disable value in response to a magnitude of the representative signal being greater than the signal magnitude, and to generate the comparator signal having an enable value in response to the magnitude of representative signal being less than the signal magnitude; a latch configured to latch the comparator signal in response to the comparator signal transitioning to the enable value; and an enable circuit configured to receive the comparator signal from the latch, to provide a latched version of the comparator signal to the drive circuit, and to transition the latched version of the comparator signal to the enable value in response to the comparator signal transitioning to the enable value and in response to the drive signal having, or transitioning to, an active value.

Example 11 includes the power-supply controller of any of Examples 1-10, further comprising: a soft-start circuit configured to generate a soft-start signal; an error amplifier configured to receive the soft-start signal, to receive a feedback signal that is related to the output signal, and to generate an error signal in response to a difference between the soft-start signal and the feedback signal; and wherein the control circuit is configured to generate the drive signal in response to the error signal.

Example 12 includes a power supply, comprising: an input node configured to receive an input signal; an output node; a first power-supply phase circuit configured to generate an output signal on the output node in response to the input signal, the output signal having a magnitude; a control circuit configured to drive the first power-supply phase with a duty cycle; and a signal-drop-reducing circuit configured to disable the first power-supply phase in response to the duty cycle corresponding to a signal magnitude that is lower than the magnitude of the output signal.

Example 13 includes the power supply of Example 12 wherein: the input signal includes an input voltage; and the output signal includes an output voltage.

Example 14 includes the power supply of any of Examples 12-13, further comprising: a second power-supply phase circuit configured to generate the output signal on the output node in response to the input signal; wherein the control circuit is configured to drive the second power-supply phase circuit with a duty cycle and with a different phase relative to a phase with which the control circuit drives the first power-supply phase circuit; and wherein the signal-drop-reducing circuit is configured to disable the second power-supply phase circuit in response to the duty cycle corresponding to a signal magnitude that is lower than the magnitude of the output signal.

Example 15 includes the power supply of any of Examples 12-14 wherein the first power-supply phase comprises: a phase node; a reference node; a first switch having a control node coupled to the control circuit and having a conduction path coupled between the input node and the phase node; a second switch having a control node coupled to the control circuit and having a conduction path coupled between the phase node and the reference node; and an inductor coupled between the phase node and the output node.

Example 16 includes the power supply of any of Examples 12-15 wherein the signal-drop-reducing circuit is coupled to the phase node.

Example 17 includes the power supply of any of Examples 12-16 wherein the first power-supply phase comprises: a phase node; a reference node; a first switch having a control node coupled to the control circuit and having a conduction path coupled between the phase node and the reference node; a second switch having a control node coupled to the control circuit and having a conduction path coupled between the phase node and the output node; and an inductor coupled between the input node and the phase node.

Example 18 includes the power supply of any of Examples 12-17 wherein the first power-supply phase comprises: a phase node; a reference node; a first switch having a control node coupled to the control circuit and having a conduction path coupled between the input node and the phase node; a second switch having a control node coupled to the control circuit and having a conduction path coupled between the phase node and the output node; and an inductor coupled between the phase node and the reference node.

Example 19 includes the power supply of any of Examples 12-18 wherein the first power-supply phase comprises: first and second phase nodes; a reference node; a first switch having a control node coupled to the control circuit and having a conduction path coupled between the first phase node and the reference node; a second switch having a control node coupled to the control circuit and having a conduction path coupled between the second phase node and the output node; a first inductor coupled between the input node and the first phase node; a second inductor coupled between the second phase node and the reference node; and a capacitor coupled between the first and second phase nodes.

Example 20 includes the power supply of any of Examples 12-19 wherein the first power-supply phase comprises: first and second phase nodes; a reference node; a first switch having a control node coupled to the control circuit and having a conduction path coupled between the first phase node and the reference node; a second switch having a control node coupled to the control circuit and having a conduction path coupled between the second phase node and the reference node; a first inductor coupled between the input node and the first phase node; a second inductor coupled between the second phase node and the output node; and a capacitor coupled between the first and second phase nodes.

Example 21 includes the power supply of any of Examples 12-20 wherein the signal-drop-reducing circuit is coupled to the second phase node.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple IC dies to form one or more ICs, these one or more ICs may be coupled to one or more other ICs. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed is:

1. A power-supply controller, comprising:
   a control circuit configured to generate a drive signal having a duty cycle;
   a drive circuit configured to cause a phase circuit of a power supply to generate, in response to the drive signal, an output signal having a magnitude; and
   a signal-drop-reducing circuit configured to receive the drive signal from the control circuit and to disable the control circuit, while the control circuit is generating the drive signal with a non-zero duty cycle, in response to the duty cycle of the drive signal received from the drive circuit being non-zero but smaller than what is necessary to cause the phase circuit to generate a signal magnitude that is equal to or greater than the magnitude of the output signal.

2. The power-supply controller of claim 1 wherein the control circuit includes a modulator circuit configured to generate the drive signal by modulating a pulse width of the drive signal.

3. The power-supply controller of claim 1 wherein the drive circuit includes:
   a non-inverting buffer circuit having a first input node configured to receive the drive signal and having a first output node configured to be coupled to the phase circuit, the non-inverting buffer configured to cause the first output node to have a high impedance state in response to the signal-drop-reducing circuit disabling the drive circuit; and
   an inverting buffer circuit having a second input node configured to receive the drive signal and having a second output node configured to be coupled to the phase circuit, the inverting buffer configured to cause the second output node to have a high impedance state in response to the signal-drop-reducing circuit disabling the drive circuit.

4. The power-supply controller of claim 1 wherein the signal-drop-reducing circuit includes a comparator circuit configured to compare a magnitude of a representative signal related to the output signal to the signal magnitude and to disable the drive circuit in response to the magnitude of the representative signal being less than the signal magnitude.

5. The power-supply controller of claim 1 wherein the signal-drop-reducing circuit includes:
   a first low-pass filter configured to generate, in response to the drive signal, a filtered version of the drive signal, the signal magnitude equaling an amplitude of the filtered version of the drive signal;
   a second low-pass filter configured to generate, in response to the output signal, a filtered version of the output signal, the magnitude of the output signal equaling an amplitude of the filtered version of the output signal; and
   a comparator circuit configured to compare the filtered version of the output signal to the filtered version of the drive signal, to disable the drive circuit in response to the amplitude of the filtered version of the output signal being greater than the amplitude of the filtered version of the drive signal, and to enable the drive circuit in response to the amplitude of the filtered version of the output signal being less than the amplitude of the filtered version of the drive signal.

6. The power-supply controller of claim 1 wherein the signal-drop-reducing circuit includes:
   a comparator configured to compare a representative signal related to the output signal to the signal magnitude, to generate a comparator signal having a disable value in response to a magnitude of the representative signal being greater than the signal magnitude, and to generate the comparator signal having an enable value in response to the magnitude of the representative signal being less than the signal magnitude; and a latch configured to provide a latched comparator signal to the drive circuit and to latch the comparator signal in response to the comparator signal transitioning to an enable value.

7. The power-supply controller of claim 1 wherein the signal-drop-reducing circuit includes:

a low-pass filter configured to generate, in response to the drive signal, a filtered version of the drive signal, the signal magnitude equaling an average amplitude of the filtered version of the drive signal; and a comparator circuit configured to compare a representative signal related to the output signal to the filtered version of the drive signal, to disable the drive circuit in response to a magnitude of the representative signal being greater than the average amplitude of the filtered version of the drive signal, and to enable the drive circuit in response to the magnitude of the representative signal being less than the average amplitude of the filtered version of the drive signal.

8. The power-supply controller of claim 1 wherein the signal-drop-reducing circuit includes:

a comparator configured to compare a representative signal related to the output signal to the signal magnitude, to generate a comparator signal having a disable value in response to a magnitude of the representative signal being greater than the signal magnitude, and to generate the comparator signal having an enable value in response to the magnitude of the representative signal being less than the signal magnitude; and a latch circuit configured to provide the comparator signal to the drive circuit and to latch the comparator signal in response to the comparator signal transitioning to the enable value and maintaining the enable value for at least one full period of the drive signal.

9. The power-supply controller of claim 1 wherein the signal-drop-reducing circuit includes:

a comparator configured to compare a representative signal related to the output signal to the signal magnitude, to generate a comparator signal having a disable value in response to a magnitude of the representative signal being greater than the signal magnitude, and to generate the comparator signal having an enable value in response to the magnitude of representative signal being less than the signal magnitude;

a latch configured to latch the comparator signal in response to the comparator signal transitioning to the enable value; and an enable circuit configured to receive the comparator signal from the latch, to provide a latched version of the comparator signal to the drive circuit, and to transition the latched version of the comparator signal to the enable value in response to the comparator signal transitioning to the enable value and in response to the drive signal having, or transitioning to, an active value.

10. The power-supply controller of claim 1, further comprising:

a soft-start circuit configured to generate a soft-start signal;

an error amplifier configured to receive the soft-start signal, to receive a feedback signal that is related to the output signal, and to generate an error signal in response to a difference between the soft-start signal and the feedback signal; and wherein the control circuit is configured to generate the drive signal in response to the error signal.

11. A power-supply controller, comprising:

a control circuit configured to generate a drive signal having a duty cycle;

a drive circuit configured to cause a phase circuit of a power supply to generate, in response to the drive signal, an output signal having a magnitude; and a signal-drop-reducing circuit configured to disable the drive circuit in response to the duty cycle corresponding to a signal magnitude that is lower than the magnitude of the output signal, wherein the signal-drop-reducing circuit includes:

a low-pass filter configured to generate, in response to the drive signal, a filtered version of the drive signal, the signal magnitude equaling an amplitude of the filtered version of the drive signal; and a comparator circuit configured to compare a representative signal related to the output signal to the filtered version of the drive signal, to disable the drive circuit in response to a magnitude of the representative signal being greater than the amplitude of the filtered version of the drive signal, and to enable the drive circuit in response to the magnitude of the representative signal being less than the amplitude of the filtered version of the drive signal.

12. A power supply, comprising:

an input node configured to receive an input signal;

an output node;

a first power-supply phase circuit configured to generate an output signal on the output node in response to the input signal, the output signal having a magnitude;

a control circuit configured to drive the first power-supply phase circuit with a drive signal having a duty cycle; and a signal-drop-reducing circuit configured to receive the drive signal from the control circuit and to disable the first power-supply phase circuit, while the control circuit is driving the first power-supply phase with a non-zero duty cycle, in response to the duty cycle of the drive signal received from the control circuit being non-zero but smaller than what is necessary to cause the first power-supply phase circuit to generate a signal magnitude that is equal to or greater than the magnitude of the output signal.

13. The power supply of claim 12 wherein:

the input signal includes an input voltage; and the output signal includes an output voltage.

14. The power supply of claim 12, further comprising:

a second power-supply phase circuit configured to generate the output signal on the output node in response to the input signal;

wherein the control circuit is configured to drive the second power-supply phase circuit with a second duty cycle and with a different phase relative to a phase with which the control circuit drives the first power-supply phase circuit; and wherein the signal-drop-reducing circuit is configured to disable the second power-supply phase circuit in response to the second duty cycle corresponding to a signal magnitude that is lower than the magnitude of the output signal.

15. The power supply of claim 12 wherein the first power-supply phase comprises:

a phase node;

a reference node;

a first switch having a control node coupled to the control circuit and having a conduction path coupled between the input node and the phase node;

a second switch having a control node coupled to the control circuit and having a conduction path coupled between the phase node and the reference node; and an inductor coupled between the phase node and the output node.

16. The power supply of claim 15 wherein the signal-drop-reducing circuit is coupled to the phase node.

17. The power supply of claim 12 wherein the first power-supply phase comprises:

a phase node;

a reference node;

a first switch having a control node coupled to the control circuit and having a conduction path coupled between the phase node and the reference node;

a second switch having a control node coupled to the control circuit and having a conduction path coupled between the phase node and the output node; and an inductor coupled between the input node and the phase node.

18. The power supply of claim 12 wherein the first power-supply phase comprises:

a phase node;

a reference node;

a first switch having a control node coupled to the control circuit and having a conduction path coupled between the input node and the phase node;

a second switch having a control node coupled to the control circuit and having a conduction path coupled between the phase node and the output node; and an inductor coupled between the phase node and the reference node.

19. The power supply of claim 12 wherein the first power-supply phase comprises:

first and second phase nodes;

a reference node;

a first switch having a control node coupled to the control circuit and having a conduction path coupled between the first phase node and the reference node;

a second switch having a control node coupled to the control circuit and having a conduction path coupled between the second phase node and the output node;

a first inductor coupled between the input node and the first phase node;

a second inductor coupled between the second phase node and the reference node; and a capacitor coupled between the first and second phase nodes.

20. The power supply of claim 12 wherein the first power-supply phase comprises:

first and second phase nodes;

a reference node;

a first switch having a control node coupled to the control circuit and having a conduction path coupled between the first phase node and the reference node;

a second switch having a control node coupled to the control circuit and having a conduction path coupled between the second phase node and the reference node;

a first inductor coupled between the input node and the first phase node;

a second inductor coupled between the second phase node and the output node; and a capacitor coupled between the first and second phase nodes.

21. The power supply of claim 20 wherein the signal-drop-reducing circuit is coupled to the second phase node.

* * * * *